United States Patent
Isikman et al.

(10) Patent No.: US 10,132,680 B1
(45) Date of Patent: Nov. 20, 2018

(54) UV DOSIMETRY AND EXPOSURE ALERT

(71) Applicant: Apple Inc., Cupertino, CA (US)

(72) Inventors: Serhan O. Isikman, Sunnyvale, CA (US); Brian R. Land, Woodside, CA (US); Erno H. Klaassen, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 238 days.

(21) Appl. No.: 15/270,839

(22) Filed: Sep. 20, 2016

Related U.S. Application Data

(60) Provisional application No. 62/233,141, filed on Sep. 25, 2015.

(51) Int. Cl.
 *G01J 1/44* (2006.01)
 *G01J 1/42* (2006.01)

(52) U.S. Cl.
 CPC .............. *G01J 1/429* (2013.01); *G01J 1/4204* (2013.01); *G01J 1/4228* (2013.01); *G01J 1/44* (2013.01)

(58) Field of Classification Search
 CPC ........ G01J 1/429; G01J 1/4204; G01J 1/4228; G01J 1/44
 See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,485,877 B2 | 2/2009 | Kearfott | |

(Continued)

FOREIGN PATENT DOCUMENTS

| | | |
|---|---|---|
| JP | 2000-163031 A | 6/2000 |
| JP | 2002-342033 A | 11/2002 |
| WO | WO-2013/034288 A1 | 3/2014 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Marcus Taningco
*Assistant Examiner* — Djura Malevic
(74) *Attorney, Agent, or Firm* — Morrison & Foerster LLP

(57) ABSTRACT

A UV dosimeter function is provided in a portable multi-function device. The device utilizes a UV light sensor to detect the user's presence while outdoors and measure the cumulative outdoor exposure time. The cumulative UV exposure is optionally provided via a messaging service or alert, and a UV index value is optionally utilized with the cumulative outdoor exposure to determine the risk of skin damage and to provide user guidance relating to recommended protective measures. An ambient light sensor is optionally provided and is used to augment the UV light thresholds used to determine the light exposure state.

20 Claims, 17 Drawing Sheets

(56) References Cited

U.S. PATENT DOCUMENTS

| | | | |
|---|---|---|---|
| 7,616,110 B2 | 11/2009 | Crump et al. | |
| 7,663,607 B2 | 2/2010 | Hotelling et al. | |
| 8,378,811 B2 | 2/2013 | Crump et al. | |
| 8,479,122 B2 | 7/2013 | Hotelling et al. | |
| 8,581,212 B2 * | 11/2013 | Young | G01J 1/02 250/372 |
| 8,618,930 B2 | 12/2013 | Papadopoulos et al. | |
| 9,068,887 B1 | 6/2015 | Bennouri et al. | |
| 9,086,323 B2 * | 7/2015 | Lian | G01J 1/0403 |
| 9,116,045 B2 * | 8/2015 | Lian | G01J 1/0403 |
| 9,383,255 B2 * | 7/2016 | Lian | G01J 1/0403 |
| 9,383,256 B2 * | 7/2016 | Lian | G01J 1/0403 |
| 9,470,577 B2 * | 10/2016 | Lian | G01J 1/0403 |
| 9,823,120 B2 * | 11/2017 | Lian | G01J 1/429 |
| 9,927,294 B2 * | 3/2018 | Lian | G01J 1/44 |
| 2005/0230598 A1 | 10/2005 | Hopkins et al. | |
| 2006/0197753 A1 | 9/2006 | Hotelling | |
| 2010/0187426 A1 * | 7/2010 | Young | G01J 1/02 250/370.07 |
| 2012/0153179 A1 * | 6/2012 | Tew | B05B 11/3042 250/372 |
| 2014/0155705 A1 | 6/2014 | Papadopoulos et al. | |
| 2015/0177055 A1 * | 6/2015 | Lian | G01J 1/0403 250/372 |
| 2015/0177056 A1 * | 6/2015 | Lian | G01J 1/0403 250/372 |
| 2015/0177057 A1 * | 6/2015 | Lian | G01J 1/0403 250/372 |
| 2015/0177058 A1 * | 6/2015 | Lian | G01J 1/0403 250/372 |
| 2015/0177059 A1 * | 6/2015 | Lian | G01J 1/0403 702/19 |
| 2015/0177063 A1 * | 6/2015 | Lian | G01J 1/0403 250/372 |
| 2016/0305819 A1 * | 10/2016 | Lian | G01J 1/44 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

| UV | VISIBLE | DETERMINATION | POSSIBLE LOCATION | ALGORITHM ACTION |
|---|---|---|---|---|
| HIGH | HIGH | AMBIENT UV | OUTDOORS | |
| HIGH | LOW | AMBIENT UV | ARTIFICIAL UV SOURCE | |
| LOW 808 | HIGH 802 | NO AMBIENT UV | BRIGHT INDOOR | USE HIGHER UV THRESHOLD |
| LOW 806 | LOW 804 | AMBIENT UV | OUTDOOR | USE LOWER UV THRESHOLD |

(rows 1-2 bracketed as 810)

|  | | ALS/UVB RATIO (AmBR) | | |
|---|---|---|---|---|
|  | | < LT1 | LT1 ≤ AmBR < HT1 | ≥ HT1 |
| UVA/UVB RATIO (ABR) | < LT2 | OUT | OUT | IN |
| | LT2 ≤ ABR < HT2 | OUT | IN | IN |
| | ≥ HT2 | IN | IN | IN |

*FIG. 9B*

| SENSOR COVERED? | IR PROX | UVB SENSOR | UVA/UVB & ALS/UVB RATIOS | EXPOSURE DECISION |
|---|---|---|---|---|
| NO | LOW | HIGH | WITHIN DEFINED THRESHOLDS | EXPOSED |
| NO | LOW | MED/LOW | NOT WITHIN DEFINED THRESHOLDS | NOT EXPOSED |
| NO | LOW | MED/LOW | NOT WITHIN DEFINED THRESHOLDS | NOT EXPOSED |
| NO | LOW | MED/LOW | WITHIN DEFINED THRESHOLDS | EXPOSED |
| NO | LOW | MED/LOW | WITHIN DEFINED THRESHOLDS | EXPOSED |
| YES | HIGH | LOW | DO NOT USE | EXPOSED |

*FIG. 9C*

UV DOSIMETRY AND EXPOSURE ALERT

CROSS-REFERENCE TO RELATED APPLICATIONS

This application claims priority to U.S. Provisional Patent Application Ser. No. 62/233,141 filed Sep. 25, 2015, which is hereby incorporated by reference in its entirety.

FIELD

This relates generally to light sensors included in electronic devices and methods for measuring one or more signals using the light sensors. More specifically, this disclosure relates to a UV dosimeter and methods for determining cumulative UV exposure.

BACKGROUND

Overexposure to ultraviolet (UV) radiation can be associated with a variety of health conditions such as sunburn, premature skin aging, skin damage, elastosis (i.e., the destruction of the elastic and collagen tissue) and skin cancer. The effects from the health conditions can range from sun spots, freckles, discolored areas of the skin (mottled pigmentation), sallowness (a yellow discoloration of the skin), telangiectasias (the dilation of small blood vessels under the skin), and benign tumors, to skin cancers (e.g., squamous cell carcinoma, basal cell carcinoma, and melanoma). In addition, exposure to UV radiation can be a risk factor for the development of cataracts and growths of the conjunctiva of the eye (i.e., pterygiums). Given the risks and possible associated health conditions, devices and methods to detect the user's presence outdoors and to determine the cumulative UV exposure time may be desired.

BRIEF SUMMARY

The forecasted UV exposure level can be quantified based on a UV index (UVI), which can be a scale from 0 to 15. The UVI can be affected by a number of factors, including: (1) the time of day, which can correlate with the height of the sun and/or the distance through the atmosphere which the UV light can be filtered; (2) the latitude and altitude of the location or region; (3) the degree of cloud cover; (4) the level of ozone; and (5) the amount of light reflection from environmental surroundings (e.g., snow and beach sand). FIG. 1A illustrates an exemplary plot of the UVI during the course of a day according to examples of the disclosure. For example, at 9:00 AM, the UV exposure level can be moderate, as indicated by a UVI of 4. Closer to the afternoon hours (e.g., 12:00 PM), the height of the sun increase the UV radiation causing an increase in the UV exposure level to very high, as indicated by a UVI of 10.

The UVI can be calculated using Brewer spectrophotometers that measure the horizontal irradiance over a spectral range from 286.5 nm to 363 nm, in 0.5 nm increments:

$$UVI = \frac{1}{25\frac{mW}{m^2}} \int_{286.5nm}^{400nm} I(\lambda) \cdot w(\lambda) d\lambda$$

where the weighting function is given as:

$$w(\lambda) = \begin{cases} 1 & 250 < \lambda \leq 298 \\ 10^{0.094 \cdot (298-\lambda)} & 298 < \lambda \leq 328 \\ 10^{0.015 \cdot (139-\lambda)} & 328 < \lambda \leq 400 \\ 0 & 100 < \lambda \end{cases}$$

The weighting can correspond to the sensitivity of human skin to the UV spectrum, as represented by the McKinlay-Diffey Erythemal Action Spectrum, depicted in FIG. 2.

This relates to a UV dosimeter provided in a personal electronic device or portable multifunction device. The device can utilize a UV light sensor to detect the user's presence while outdoors and determine the cumulative outdoor exposure time. A UV index value can be utilized with the cumulative outdoor exposure to inform the user of the actual and/or estimated UV exposure and/or to determine the risk of one or more associated health conditions. In some variations, the device may provide user guidance relating to recommended protective measures. An ambient light sensor (ALS) can be optionally included in the device and can be used to augment the UV light thresholds used to determine the light exposure state.

In one example, a dosimeter system is provided, comprising an ultraviolet light sensor and an analyzer configured to receive a sensor signal from the ultraviolet light sensor, determine an exposure time using the ultraviolet light sensor, and determine a total dose using the exposure time and ultraviolet index information. The dosimeter system may further comprise a communication module configured to remotely obtain the ultraviolet index information. The ultraviolet index information may comprise time-dependent and/or location-dependent ultraviolet index information, which may be hourly ultraviolet index information or continuous ultraviolet index information over a day period. The total dose may be calculated by integrating the exposure time and the time-dependent ultraviolet index information. The analyzer may be further configured to provide an alert when the total dose reaches a dose threshold. The analyzer may also be further configured to receive questionnaire input by a user, determine the skin sensitivity factor from the questionnaire input, and adjust a dose threshold using the skin sensitivity factor. To determine the exposure time using the ultraviolet light sensor, the analyzer may be further configured to identify a start time point when the sensor signal from the ultraviolet light sensor meets or exceeds a first UV threshold, and identify an end time point when the sensor signal from the ultraviolet light sensor drops below a second UV threshold. To determine the exposure time uses the ultraviolet light sensor, the analyzer may be further configured to calculate an incremental exposure period from the start time point to the end time point. In some variations, the analyzer is further configured to identify a conditional time point after the end time point, cancel the conditional time point if the signal meets or exceeds a third UV threshold before the conditional time threshold, re-identify the end time point and the conditional time point after the sensor signal from the ultraviolet light sensor drops below a fourth UV threshold, and after reaching the conditional time point, calculate an incremental exposure period between the start time point and either the end time point or the conditional time point. The analyzer may also be further configured to accumulate the incremental exposure period to determine the exposure time. To determine the total dose using the exposure time and ultraviolet index information, the analyzer may be further configured to calculate an incremental dosage using the incremental exposure period and ultraviolet index information, and accumulate the incremental dosage to determine the total dose. The first and second UV thresholds may be the same or different, and the first and third UV thresholds may also be the same or different. The dosimeter system may also further comprise a visible light filter in an optical path of the ultraviolet light sensor, and/or a visible light sensor. The analyzer may be further configured to set the first UV threshold using the visible light signal from the visible light sensor. In some variations, the conditional time point may be determined using the end time point plus a conditional period. In some variations, the conditional period is user-adjustable, and may be also be set to zero or otherwise shut off. The exposure time may be configured to correspond to a total number of pre-determined periods wherein a signal from the ultraviolet light sensor meets or exceeds a UV signal threshold. In some variations, the exposure time may be low-pass filtered or signal-smoothed. In some examples, the ultraviolet light sensor may be located in a portable multifunction device, including a watch. In some examples of a watch, the ultraviolet light sensor may be located in a sidewall of the watch.

In another example, a dosimeter system is provided, comprising a first sensor, a second sensor, and an analyzer configured to receive a first sensor signal from the first sensor, receive a second sensor signal from the second sensor, set a first sensor threshold using the second sensor signal, determine an exposure time using the first sensor and the first sensor threshold, and determine a total dose using the exposure time and dose index information. The analyzer may be further configured to retrieve the dose index information from a remote service, and the exposure time may be low-pass filtered or signal-smoothed. To determine the exposure time using the first sensor, the analyzer may be further configured to set a start time point when the first sensor signal from the first sensor meets or exceeds a first signal threshold, set an end time point when the first sensor signal from the first sensor drops below a second threshold, set a conditional time threshold after the first end time point, reset the end time point and the conditional time threshold if the first sensor signal meets or exceeds a third threshold between the end time point and the conditional time threshold, and after reaching the conditional time point, calculate an exposure time between the start time point and either the end time point or the conditional time point.

In another embodiment, a method for measuring UV exposure is provided, comprising receiving a sensor signal from an ultraviolet light sensor, determining an exposure time using the ultraviolet light sensor, and determining a total dose using the exposure time and ultraviolet index information. The method may further comprise remotely obtaining the ultraviolet index information, where the ultraviolet index information comprises time-dependent and/or location-dependent ultraviolet index information. The time-dependent ultraviolet index information may be hourly ultraviolet index information or continuous ultraviolet index information over a day period. The total dose may be calculated by integrating the exposure time and the time-dependent ultraviolet index information. The method may further comprise outputting an indicator signal if the exposure time or the total dose reaches an indicator threshold total dose. The indicator may be adjustable using a skin sensitivity factor, and the method may optionally further comprise receiving questionnaire input from a user, and determining the skin sensitivity factor from the questionnaire input. The method may also further comprise identifying a start time point when the sensor signal from the ultraviolet light sensor meets or exceeds a first UV threshold, and identifying an end time point when the sensor signal from the ultraviolet light sensor drops below a second UV threshold. The method may also further comprise calculating an incremental exposure period from the start time point to the end time point, and/or identifying a conditional time point after the end time point, cancelling the conditional time point if the signal meets or exceeds a third UV threshold before the conditional time threshold, re-identifying the end time point and the conditional time point after the sensor signal from the ultraviolet light sensor drops below a fourth UV threshold, and after reaching the conditional time point, calculating an incremental exposure period between the start time point and either the end time point or the conditional time point. The method may also further comprise accumulating the incremental exposure period to determine the exposure time. In some examples, determining the total dose using the exposure time and ultraviolet index information may comprise calculating an incremental dosage using the incremental exposure period and ultraviolet index information, and accumulating the incremental dosage to determine the total dose. The first and second UV thresholds may be the same or different, and the first and third UV thresholds may be the same or different. The method may also further comprise filtering visible light from an optical path of the ultraviolet light sensor, and/or using a visible light signal from a visible light sensor, wherein the conditional time point may be determined using the end time point plus a conditional period. The conditional period may be user-adjustable, including to zero or otherwise shut-off. In some variations, the exposure time may correspond to a total number of pre-determined periods wherein a signal from the ultraviolet light sensor meets or exceeds a UV signal threshold. The method may also further comprise low-pass filtering or signal smoothing the sensor signal from the ultraviolet light sensor.

In another embodiment, a method for performing dosimetry is provided, comprising receiving a first sensor signal from a first sensor, receiving a second sensor signal from a second sensor, setting a first sensor threshold using the second sensor signal, determining an exposure time using the first sensor and the first sensor threshold, and determining a total dose using the exposure time and dose index information. The method may further comprise retrieving the dose index information from a remote service, low-pass filtering and/or signal-smoothing the first sensor signal from the first sensor. In some variations, determining the exposure time using the first sensor may comprise setting a start time point when the first sensor signal from the first sensor meets or exceeds a first signal threshold, setting an end time point when the first sensor signal from the first sensor drops below a second threshold, setting a conditional time threshold after the first end time point, resetting the end time point and the conditional time threshold if the first sensor signal meets or exceeds a third threshold between the end time point and the conditional time threshold, and after reaching the conditional time point, calculating an exposure time between the start time point and either the end time point or the conditional time point.

BRIEF DESCRIPTION OF THE DRAWINGS

FIGS. 9B-9C illustrate exemplary tables used to determine whether the user is indoor or outdoor according to examples of the disclosure.

DETAILED DESCRIPTION

Figure 1A:
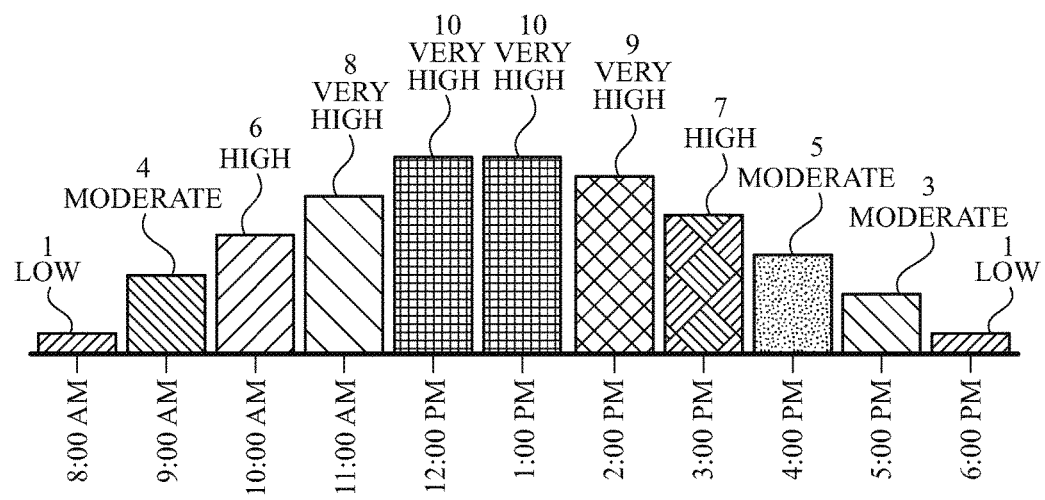
FIGS. 1A-1B illustrate exemplary plots of the UVI during the course of a day according to examples of the disclosure.

Described herein are various examples of an ultraviolet (UV) dosimeter included in an electronic device (e.g., mobile and/or wearable devices). The UV dosimeter can include a UV sensor, which can be used to identify time periods when the user is located outdoors. In some examples, the UV spectrum of natural sunlight may be detected by the UV sensor, even when the UV sensor may be partially blocked (e.g., by clothing or in the presence of outdoor shade or cloudiness). The outdoor time periods and time-of-day information can be accumulated by a controller. Continuous, hourly and/or daily UV index information of the user's location for each outdoor time period can be determined, and the controller can calculate a dosage value for each time period and the cumulative dosage total value. The controller may receive and send location information in order to receive location-dependent UV index information, and may also initiate or generate an alert or notification that informs the user of the calculated cumulative dosage total value.

Optionally, based on the UV index, recommendations of suggested protective measures and other exposure information may be provided to the user (e.g., at a specified time of day, based upon events in a calendar application, upon or before the user proceeding outdoors). For example, such recommendations may be provided to the user at the start of the day. In some variations, the UV sensor may be able to detect the presence of high intensity (e.g., UVI≥8) UV radiation. Optionally, as the cumulative dosage total value reaches certain thresholds, the controller may generate additional user reminders and/or alerts relating to protective measures or other information.

A visible light or ambient light sensor may also be included. This light sensor may be utilized to adjust the UV threshold value to account for the presence of, e.g., outdoor shade or clothing blockage. For example, if reduced ambient light conditions are detected, which may be indicative of clothing blockage, outdoor shade or shadows, and/or use of tanning beds, the UV threshold may be adjusted downward to increase the sensitivity and/or accuracy of the UV light detection. In other examples, the UV index value may be used alone, or in conjunction with the ambient light sensor, to adjust the UV threshold.

In some further examples, the UV dosimeter may be configured to reduce the effect of transient decreases in UV sensor signal values, which may be indicative of transient clothing blockage, heterogeneous indoor/outdoor/shade activities. This may be performed, for example, by measuring UV exposure periods whereby transient decreases of a limited duration are excluded or otherwise not counted or used to determine an exposure period. Or, put another way, the end of the exposure period may not be not finalized or determined until a subthreshold UV sensor value persists for at least the limited duration. In other examples, smoothing filters or low-pass filters may be applied to the sensor signal to reduce transient drops in the sensor value.

The UV sensor of a UV dosimeter may be located on a wearable or mobile device, while the controller and other components may be located on the same device or a separate device, for example, a computer or a separate wearable or mobile device. In one example, the UV sensor may be located on a wrist-worn device (e.g., a watch, wrist-band, or bracelet), an article of clothing, or a smart phone or tablet. In some variations, and UV sensor may be located on the wrist-worn device, an article, clothing, or a smart phone, while the controller and other components may be located on a tablet, laptop, or desktop computer. The controller of the UV dosimeter may be in communication with the controller of the wearable or mobile device to which the dosimeter is attached, and/or a separate computer (e.g., tablet, laptop, or desktop computer). In some variations, the UV dosimeter may be integrated with these other devices, but in other examples, the UV dosimeter may be in a separate module that is attachable by a user to a wearable or mobile device. For example, the UV dosimeter may comprise an adaptor or device configured to attach to a port (e.g., a USB port) of a computing device. In some variations, the UV dosimeter may have a dedicated controller distinct from the controller of the wearable or mobile device and the controller of other computing devices (e.g., tablet, laptop, desktop computer, remote server, etc.). The controller of the UV dosimeter may perform spectrometer-specific methods and/or may perform general computing methods. Any of the methods described below may be performed by the UV dosimeter controller, the wearable or mobile device controller, the computing device controller, and/or a combination of two or more of these controllers. For example, methods for determining whether the user is outdoors may be performed by the UV dosimeter controller while methods for generating user notifications may be performed by the wearable or mobile device controller and/or a tablet computer. Analysis and interpretation of sensor data (e.g., UV light, GPS, visible light, IR light, and any other sensors), UV light threshold calculations and adjustments, total UV dose calculations, and storage of data of any kind may be performed by one or more of the controllers described above.

Although the following description uses terms "first," "second," etc. to describe various elements, these elements should not be limited by the terms. These terms are only used to distinguish one element from another. For example, a first light source could be termed a second light source, and, similarly, a second light source could be termed a first light source, without departing from the scope of the various described variations. The first light source and the second light source are both light sources, but they are not the same light source.

The terminology used in the description of the various described variations herein is for the purpose of describing particular variations only and is not intended to be limiting. As used in the description of the various described variations and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Variations of electronic devices, user interfaces for such devices, and associated processes for using such devices are described. In some variations, the device is a portable communications device, such as a mobile telephone, an internet-enabled telephone such as a smartphone, or a wearable communications device, such as a wristband, watch, clip, headband, earphone or ear piece, internet-enabled eyewear, or any computing device, portable or otherwise, such as a personal calendaring device, electronic reader, tablet, desktop, or laptop computers, etc. Any of these devices may also contain other functions, such as personal digital assistant (PDA) and/or music player functions. Optionally, any of the above-listed electronic devices may comprise touch-sensitive surfaces (e.g., touch screen displays and/or touchpads). Alternatively or additionally, the electronic devices may include one or more other physical user-interface devices, such as a physical keyboard, a mouse, and/or a joystick.

Figure 3A:
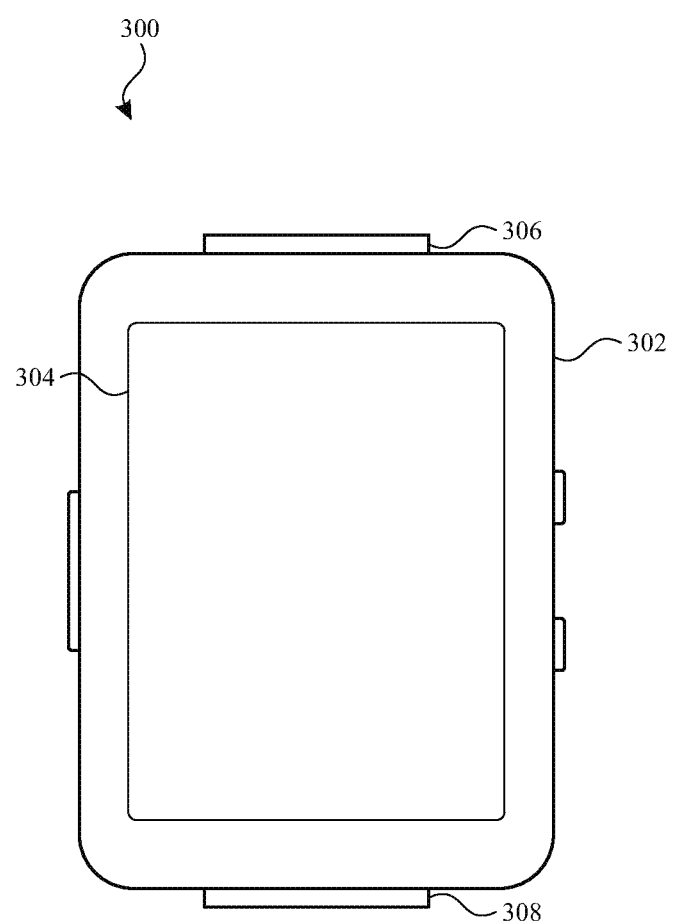
FIG. 3A illustrates a top view of an exemplary electronic device including a UV sensor accordance with examples of the disclosure.

FIG. 3A illustrates an exemplary electronic device including a UV sensor accordance with examples of the disclosure. Device 300 includes body 302. Personal electronic device 300 may be a portable device such as a smart phone, tablet, watch, and in some variations, may be part of a wireless-capable eyepiece or eye-wear, head gear, and the like. In other variations, personal electronic device 300 may not be a portable device, and may be desktop computer. In some variations, device 300 has touch-sensitive display screen 304. Alternatively, or in addition to touch screen 304, device 300 may have a display and a touch-sensitive surface. In some variations, touch screen 304 (or the touch-sensitive surface) may have one or more intensity sensors for detecting intensity of contacts (e.g., touches) being applied. The one or more intensity sensors of touch screen 304 may provide output data that represents the intensity of touches. The user interface of device 300 can respond to touches based on their intensity. For example, touches of different intensities can invoke different user interface operations on device 300.

In some variations, device 300 may have one or more input mechanisms 306 and 308. Input mechanisms 306 and 308, if included, can be physical. Examples of physical input mechanisms may include push buttons and rotatable mechanisms. In some variations, device 300 may have one or more attachment mechanisms. Such attachment mechanisms, if included, can permit attachment of device 300 with, for example, hats, eyewear, earrings, necklaces, shirts, jackets, pockets, collars, bracelets, watch straps, chains, trousers, belts, shoes, socks, purses, backpacks, undergarments, and so forth. These attachment mechanisms may permit device 300 to be worn by a user.

Figure 3B:
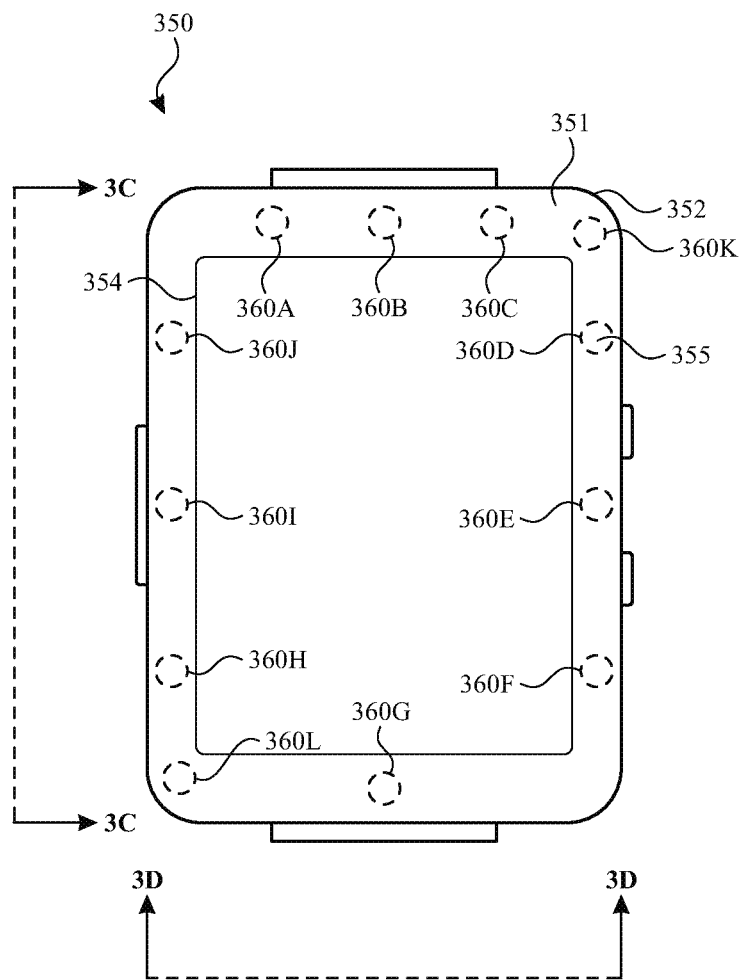
FIGS. 3B-3D illustrate superior, lateral and frontal views of an exemplary electronic device depicting various sensor positions.
Figure 3C:
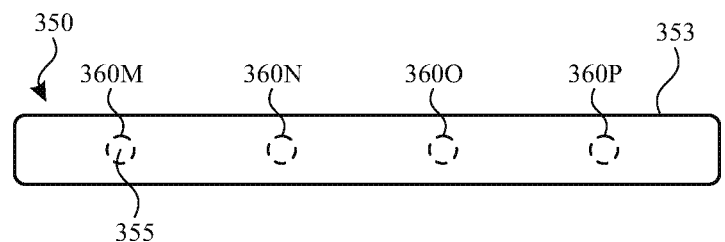
Figure 3D:
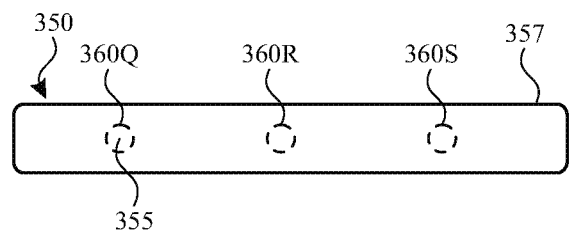

FIGS. 3B-3D illustrate superior, lateral and frontal views of an exemplary electronic device depicting various sensor positions. Device 350 includes body 352. Personal electronic device 350 may be a portable device such as a smart phone, tablet, watch, and in some variations, may be part of a wireless-capable eyepiece or eye-wear, head gear, and the like. In other variations, personal electronic device 350 may not be a portable device, and may be desktop computer. In some variations, device 350 has touch-sensitive display screen 354. Device 350 may comprise a UV dosimeter, such as any of the UV dosimeters described herein. The UV dosimeter may comprise one or more UV sensors 355, which may be located at one or more locations 360a-s on the device 350. Some devices may have a first UV sensor 355 located on a top face 351 of the body 352, or along a first sidewall portion 353 of the body 352 (e.g., along the length as depicted in FIG. 3C) and/or along a second side wall portion 357 (e.g., along the width as depicted in FIG. 3D). One or more UV sensors 355 may be located along the length of the top face 351, such as locations 360d-f, h-j, and/or located along the width of the top face 351, such as locations 360a-c, g. Alternatively or additionally, UV sensors may also be located at one or more corners of the device body 351, for example, at locations 360k, l. Providing one or more UV sensors 355 on one side of the device 350 (e.g., top and/or left side of the top face) and one or more UV sensors 355 on the opposite side of the device 350 (e.g., bottom and/or right side of the top face) may allow the device 350 to detect UV light regardless of its orientation. Alternatively or additionally, the device 350 may have one or more UV sensors 355 located on a first side wall portion 353, such as locations 360m-p as depicted in FIG. 3C, and/or second side wall portion 357, such as locations 360q-s.

Figure 3E:
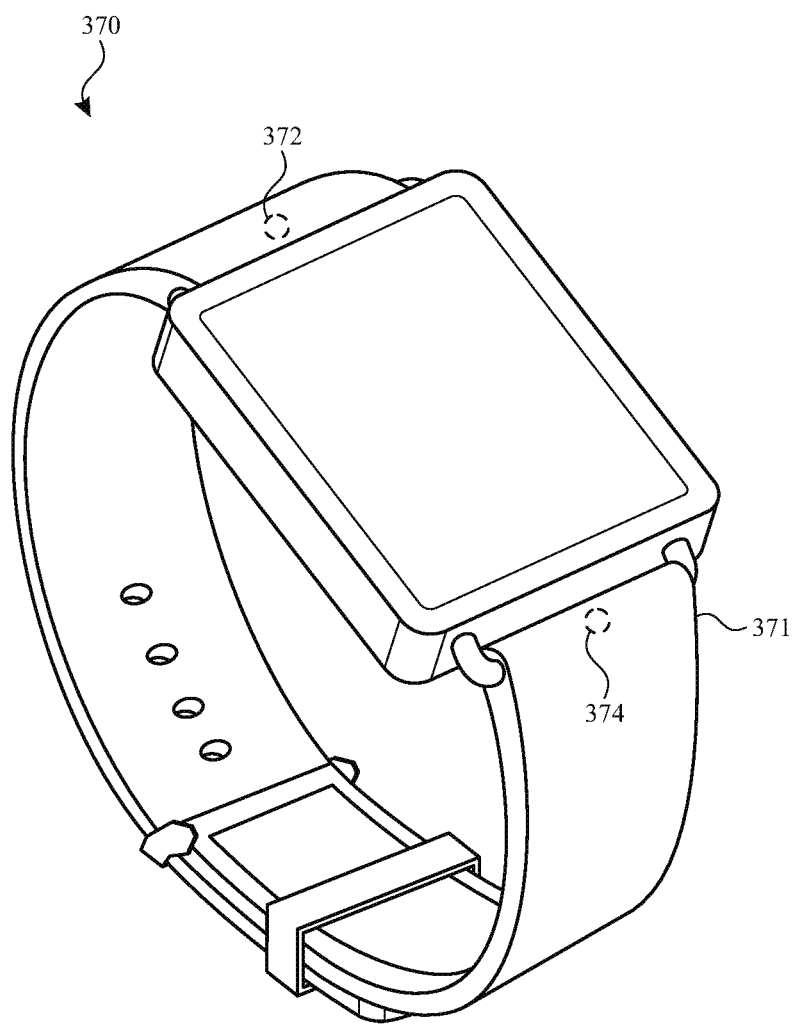
FIG. 3E illustrates a perspective view of an exemplary watch device including a UV dosimeter according to examples of the disclosure.

FIG. 3E illustrates a perspective view of an exemplary watch device including a UV dosimeter according to examples of the disclosure. Personal device 370 may have features and functions similar to that of devices 300, 350, and may also comprise a UV dosimeter similar to those described herein. The one or more UV sensors of the UV dosimeter may be located at any of the locations depicted in FIGS. 3B-3D, and/or may also be located on a wristband 371 of the device 370.

Figure 3F:
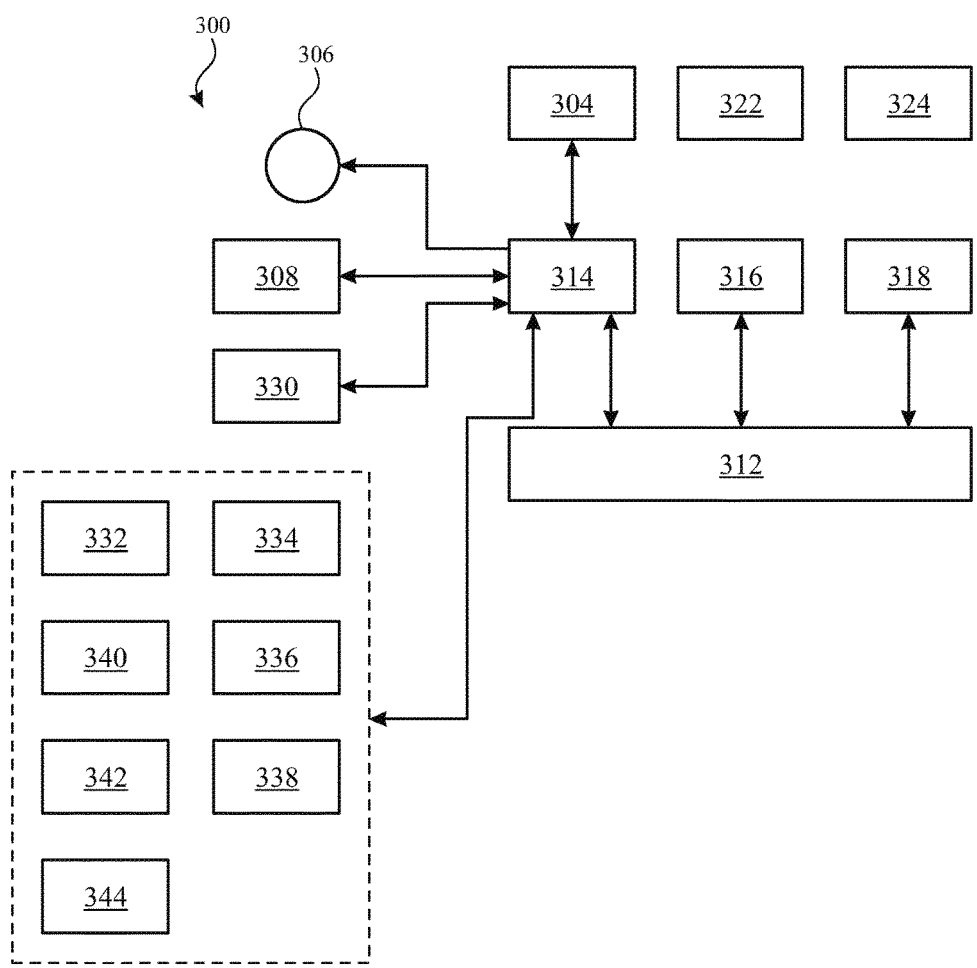
FIG. 3F illustrates an exemplary block diagram included in an electronic device according to examples of the disclosure.

FIG. 3F illustrates an exemplary block diagram included in an electronic device according to examples of the disclosure. Similar components may also be included in devices 350 and 370. Device 300 has bus 312 that operatively couples I/O section 314 with one or more computer processors 316 and memory 318. I/O section 314 may be connected to display 304, which may have a touch-sensitive component 322 and, optionally, a touch-intensity sensitive component 324. In addition, I/O section 314 may be connected with communication unit 330 for receiving application and operating system data, using Wi-Fi, Bluetooth, near field communication (NFC), cellular, and/or other wireless communication techniques. Device 300 may include input mechanisms 306 and/or 308. Input mechanism 306 may be a rotatable input device or a depressible and rotatable input device, for example. In some examples, input mechanism 308 may be a button.

Input mechanism 308 may be a microphone, in some examples. Personal electronic device 300 can include various sensors, such as GPS sensor 332, accelerometer 334, directional sensor 340 (e.g., compass), gyroscope 336, motion sensor 338, and/or a combination thereof, all of which can be operatively connected to I/O section 314. Examples with a UV dosimeter, described in greater detail below, may include a UV sensor 342 and optionally a visible light or ambient light sensor 344.

Memory 318 of personal electronic device 300 can be a non-transitory computer-readable storage medium, for storing computer-executable instructions, which, when executed by one or more computer processors 316, for example, can cause the computer processors to perform the techniques described herein. The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. A "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic devices 300, 350, 370 may not be limited to the components and configuration of FIG. 3F, but can include other or additional components in multiple configurations.

Attention is now directed towards variations of user interfaces ("UI"), additional device modules, and associated processes that may be implemented on an electronic device, such as portable multifunction device 300, including a UV dosimeter system.

Figure 4:
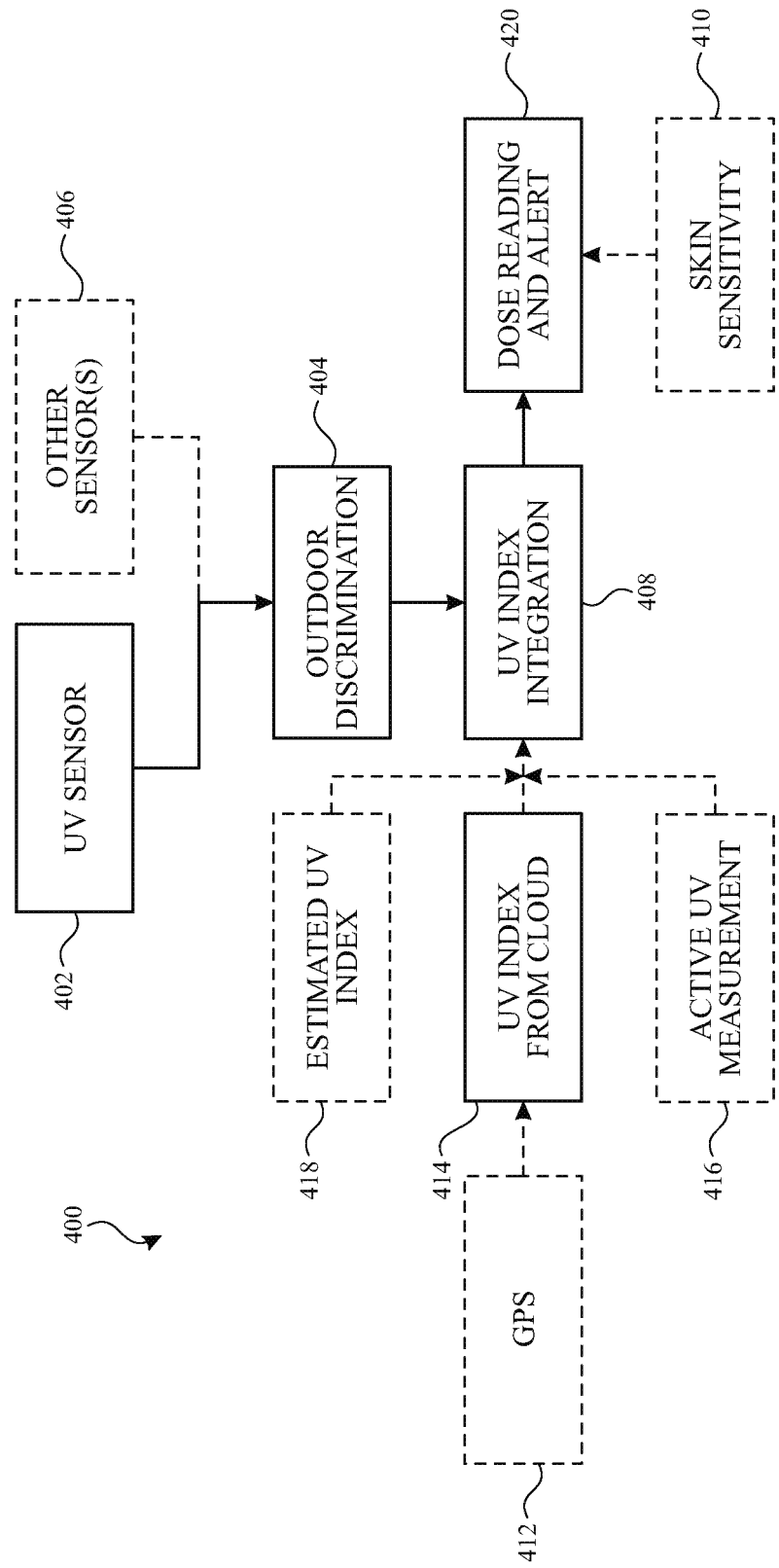
FIG. 4 illustrates an exemplary block diagram depicting the signal flow of a UV dosimeter system according to examples of the disclosure.

FIG. 4 illustrates an exemplary block diagram depicting the signal flow of a UV dosimeter system, which may be provided in the personal electronic device or portable multifunction device. The UV dosimeter system 400 may comprise sensors such as a UV sensor 402 (an optionally, other sensors 406 as described below), and a controller that implements one or more of the methods represented by the following functional blocks or modules: outdoor discrimination module 404, UV integration module 408, and dose alert module 420. These blocks or modules may be implemented in a UV dosimeter controller, a wearable or mobile device controller, a computing device controller (e.g., tablet, laptop, desktop computer, remote server, etc.), and/or a combination of these controllers. One or more UV sensors 402 may be located on any portion of the device that may be exposed to UV light. For example, one or more UV sensors 402 may be mounted within a housing of the device behind a UV-transparent window, or mounted on an exposed surface of the device, or may be mounted at a location that receives reflected UV light (e.g., reflected by a mirror, any reflective surface, and/or optical lens assembly). The sensor signal then input to the outdoor discrimination module 404 to perform outdoor detection to determine whether the device is likely to be in an outdoor location, based upon the strength of the sensor signal. Thus, the UV sensor may be used to identify outdoor sunlight conditions, but the magnitude of the sensor signal may or may not be used to determine the intensity of the UV exposure. Data from other sensors 406, such as a visible light sensor, a GPS sensor, a proximity sensor (e.g., an IR sensor), may also be utilized by the outdoor discrimination module 404 to further enhance the accuracy of determining whether the device is located at an indoor or outdoor location. The time periods of outdoor sunlight exposure are measured and accumulated over the course of a day and a dosage total at any point in time may be calculated by the UV integration module 408. In some examples, the dosage total may be the integration or product of the time period and the corresponding UV index value associated with that time period.

The UV integration module 408 may receive UV index data obtained or generated from one or more of the sources or methods represented by blocks 414, 416, 418. The UV index value may be determined in a number of ways. For example, the dosimeter system 400 may utilize location information (e.g., from a GPS system 412 and/or from user input), and use the location information and a communication module to obtain UV index information from a remote server or cloud computing system 414. In other examples, the UV sensor may be used to directly or actively measure the UV index 416 at the device location and time, and use that direct measured UV index 416 to perform the integration to assess total dosage. In other variations, including but not limited to circumstances where remote access is unavailable, estimated UV index information 418 may be utilized, based upon a historical or generic UV index. The generic UV index may be the last remotely acquired UV index, or a calculated UV index based upon the longitude and latitude of the user's last known location or entered location. The last remotely acquired UV index or calculated UV index may be stored in the memory of the dosimeter controller and/or wearable or mobile device controller.

In some variations, the UV index integration module 408 may adjust the UV index value obtained from a remote server or cloud computing system and/or generic or historically-derived UV index based on a scaling factor that is derived from the active UV measurement 416 (e.g., dosimeter UV sensor signals). The adjusted UV index may reflect local light conditions by at least partially accounting for, for example, shade, cloud cover, ground-surface reflection (e.g., from glass surfaces, metallic surfaces, certain water surfaces such as from a lake or ocean, sea foam, sand, snow, concrete, etc.). For example, the UV index may be multiplied by the scaling factor, and this adjusted UV index may be used in the cumulative UV dose calculations (described elsewhere).

This may help to fine-tune the computation of UV dosage to account for local UV light exposure that may not be represented in the UV index value obtained from the remote server or cloud. The scaling factor may be calculated in a number of ways. In one variation, the scaling factor may be based on UV sensor readings, such that a particular UV sensor signal value may be mapped to a particular scaling factor value. For example, the dosimeter analyzer module may use a look-up table of scaling factors that is indexed by the output voltage of a UV sensor to select a scaling factor that corresponds with the current UV sensor signal. Such look-up table may be stored in the memory of the dosimeter analyzer module and/or controller. Alternatively or additionally, the scaling factor may be calculated by a formula where the input variable is the output voltage of the UV sensor.

In some variations, the scaling factor may be calculated based on the UV sensor signal as well as the UV index value obtained from a remote server or cloud computing system and/or the UV index value derived from historical data. For example, for a given UV sensor signal reading, the scaling factor may be different depending on the UV index value. For illustrative purposes, Table 1 below shows the scaling factors for a range of UV sensor signals when the UV index is 4, and Table 2 below shows the scaling factors for a range of UV sensor signals when the UV index is 8. The UV sensor signals are in arbitrary units that may be normalized over the output voltage range of the particular UV sensor. The UV sensor signals at the boundary of the ranges may be mapped to either the higher or lower scaling factor. In some variations, the UV sensor signals at the boundary of the ranges may be mapped to the lower scaling factor while in other variations, the boundary UV sensor signals may be mapped to the higher scaling factor. The data in these tables may be stored in the memory of the analyzer module and/or controller. In these examples, for a UV sensor signal that is from about 3 to about 4, the scaling factor may be 1 when the UV index is 4, but when the UV index is 8, the scaling factor may be 0.5. In the situation where the UV index is 8, but the measured UV sensor signal indicates a UV light level that is lower than what would be expected for a level 8 UV index (e.g., due to localized cloud cover, etc.), the analyzer module may compensate for that by adjusting down the UV index (e.g., by multiplying the level 8 UV index by 0.5). Adjusting the UV index in this manner may improve the accuracy of the cumulative UV dose calculation (i.e., by not overestimating the UV exposure). In other examples, the measured UV sensor signal may indicate a UV light level that is greater than what would be expected for a particular level UV index, possibly due to localized sources of UV light, such as ground-surface reflection. The scaling factor may then be greater than one so that the cumulative UV dose calculation can account for this localized UV light source (i.e., not underestimate the UV exposure).

TABLE 1

| UV Index 4 | |
|---|---|
| UV sensor output | Scaling factor |
| <1 | 0.25 |
| 1-2 | 0.5 |
| 2-3 | 0.75 |
| 3-4 | 1 |
| 4-5 | 1.25 |
| 5-6 | 1.5 |
| 6-7 | 1.75 |
| 7-8 | 2 |

TABLE 2

| UV Index 8 | |
|---|---|
| UV sensor output | Scaling factor |
| <2 | 0.25 |
| 2-4 | 0.5 |
| 4-6 | 0.75 |
| 6-8 | 1 |
| 8-10 | 1.25 |
| 10-12 | 1.5 |

In dosimeter systems that comprise an ambient light sensor and/or an infrared (IR) light sensor, the scaling factor may be calculated based on the UV sensor signal, the UV index value obtained from a remote server or cloud computing system (and/or the UV index value derived from historical data), as well as the ambient light sensor and/or IR light sensor signals. The scaling factor may be calculated by a UV dosimeter controller, a wearable or mobile device controller, a computing device controller (e.g., tablet, laptop, desktop computer, remote server, etc.), and/or a combination of these controllers. If the ambient light sensor and/or the IR light sensors detect a scenario in which an object (such as a sleeve, etc.) may be covering the UV sensor, the scaling factor may be adjusted downwards from what it would have been if the UV sensor were not obstructed. For example, if the IR sensor and/or ambient light sensor signals indicate that an object such as a sleeve is covering the UV sensor and the UV index value is 4, the scaling factor may be adjusted as indicated in Table 3 below.

TABLE 3

| UV Index 4 with sleeve coverage | |
|---|---|
| UV sensor output | Scaling factor |
| <1 | 0.5 |
| 1-2 | 0.75 |
| 2-4 | 1 |

Some variations of a UV dosimeter may use the IR light sensor to detect the proximity of objects to the UV sensor. In addition to determining whether the UV sensor is obstructed, such proximity sensing data may be used by the controller to further fine-tune the scaling factor depending on the distance of the object nearest to the UV sensor. For example, the IR sensor signals may indicate that an object (e.g., clothing, material, etc.) is very close to the UV sensor (e.g., less than about 1 mm away, less than about 3 mm away, less than about 10 mm away, less than about 20 mm away, less than about 30 mm away, about 1 mm away, about 2 mm away, about 5 mm away, about 10 mm away, etc.), or that an object is far away (e.g., greater than about 30 mm away, greater than about 4 cm away, greater than about 5 cm away, greater than about 10 cm away, about 20 cm away, about 50 cm away, etc.). Different scaling factors may be used depending on the distance of the nearest object. That is, if a sleeve is determined to be about 10 mm away from the UV sensor, a scaling factor may be derived that is greater than the scaling factor of the sleeve if it was about 2 mm away from the UV sensor.

In some variations, such proximity data may also be used to adjust the UV threshold(s) used by a controller (e.g., an analyzer module of the controller) to determine whether the user is indoors (e.g., in a low UV environment) or outdoors (e.g., in a high UV environment). For example, there may be a distance threshold where if an object is less than the distance threshold, the UV threshold(s) may be adjusted (e.g., lowered) relative to the UV threshold(s) if that object was not present (i.e., UV sensor completely unobstructed). By scaling the UV threshold(s) according to proximity data, the UV sensor data may be more accurately interpreted by the analyzer module despite being covered by an object (e.g., sleeve, clothing material, etc.).

Once the integration of the exposure time and the UV index is performed to determine a dosage total, the dosage total may be provided to the dose reading and alert module 420, which may generate an alert or message with the dosage total to the user or other recipient, e.g. a parent of a child wearing the device. The dosage total may also be compared to one or more risk thresholds and an alert or message may be provided by the dose alert module 420 to suggest one or more recommended sun protective measures, for example. The alerts or messages, or the dosage thresholds for providing the alerts or messages may be modified based upon the user's skin sensitivity 410. Skin sensitivity 410 may be determined by manual user input, validated skin sensitivity scales, such as the Fitzpatrick scale, and/or by user-reported sunburn events correlated to prior time periods of outdoor sunlight exposure or exposure risk. Skin sensitivity 410 may also take into account recent episodes of increased sun exposure, which can be used to increase or decrease the conditions or dosage thresholds for determining user messaging.

The UV sensor may be any of a variety of sensors capable of detecting at least a portion of the UV light spectrum. Although described herein as ultraviolet sensors, some contribution from visible light spectrum may affect the sensor signal, and in some examples, a visible light and/or infrared blocking filter may be used with the UV sensor to decrease false UV detection. The UV sensor may comprise a digital and/or analog sensor signal. In some examples, the UV sensor may be calibrated so that the magnitude of the sensor signal corresponds to UV Index values from 0 to 15.

It is hypothesized that during use, the UV sensor may experience a variety of circumstances where its sensor signal may not be fully exposed to sunlight, and therefore the sensor signal may be reduced or zero. For example, if UV sensor is worn in a watch or armband, the UV sensor may be covered by clothing, or objects and structures in the surrounding environment. In other examples, the sensor may be partially or fully blocked from direct sunlight exposure, based upon the user's body position relative to the sun, or the user's location in a car or under a tree.

In some examples, multiple UV sensors may be provided on a device, which may enhance the accuracy of outdoor sunlight detection. For example, where the UV dosimeter is provided on a watch, the UV sensor may be positioned on a distal side surface of the watch, so that the sensor would be facing out toward the fingers of the user. This may increase the likelihood that UV sensor is configured to at least intermittently detect outdoor sunlight while the user is wearing long sleeve clothing. In some further examples, a UV sensor may also be placed on the proximal side surface of the watch, in case the watch is worn by a left-handed user, or to possibly detect UV light passing through the sleeve material, which may be helpful in circumstances where the sleeve cuff is too thick or is elastically bound to the wrist such at UV light detection from the distal side surface of the watch is impaired. In still other examples, UV sensors may be provided on the top and bottom side surfaces, the watch face, and/or the watch band or watch band clasp. In still other variations, UV sensors may be provided on separate other devices or equipment, and remotely queries by the UV dosimeter system. These other devices may include cell phones, tablets, necklaces, eyeglasses, contact lenses, shoes and sandals, bicycles and other exercise or sports equipment, and clothing, e.g. hats, headbands and swimwear, water bottles, and the like. In variations comprising multiple UV sensors, the UV dosimeter system may select the sensor signal with the highest value, or average two or more sensor signals, to perform outdoor sunlight discrimination.

In some variations, the UV sensor may be selected based upon its sensitivity to a variety of light conditions, or use cases involving blockage of the sensor. For example, the sensor may be tested for the ability to detect UV light through a variety of clothing types, fabric materials and in a variety of colors. While certain clothing and fabrics may attenuate the sensed UV sensor signal, it is found that many clothing and fabric types do not completely block the transmission of UV light, so that the detection any significant UV light signal may accurately detect an outdoor sun exposure state.

Figure 5A:
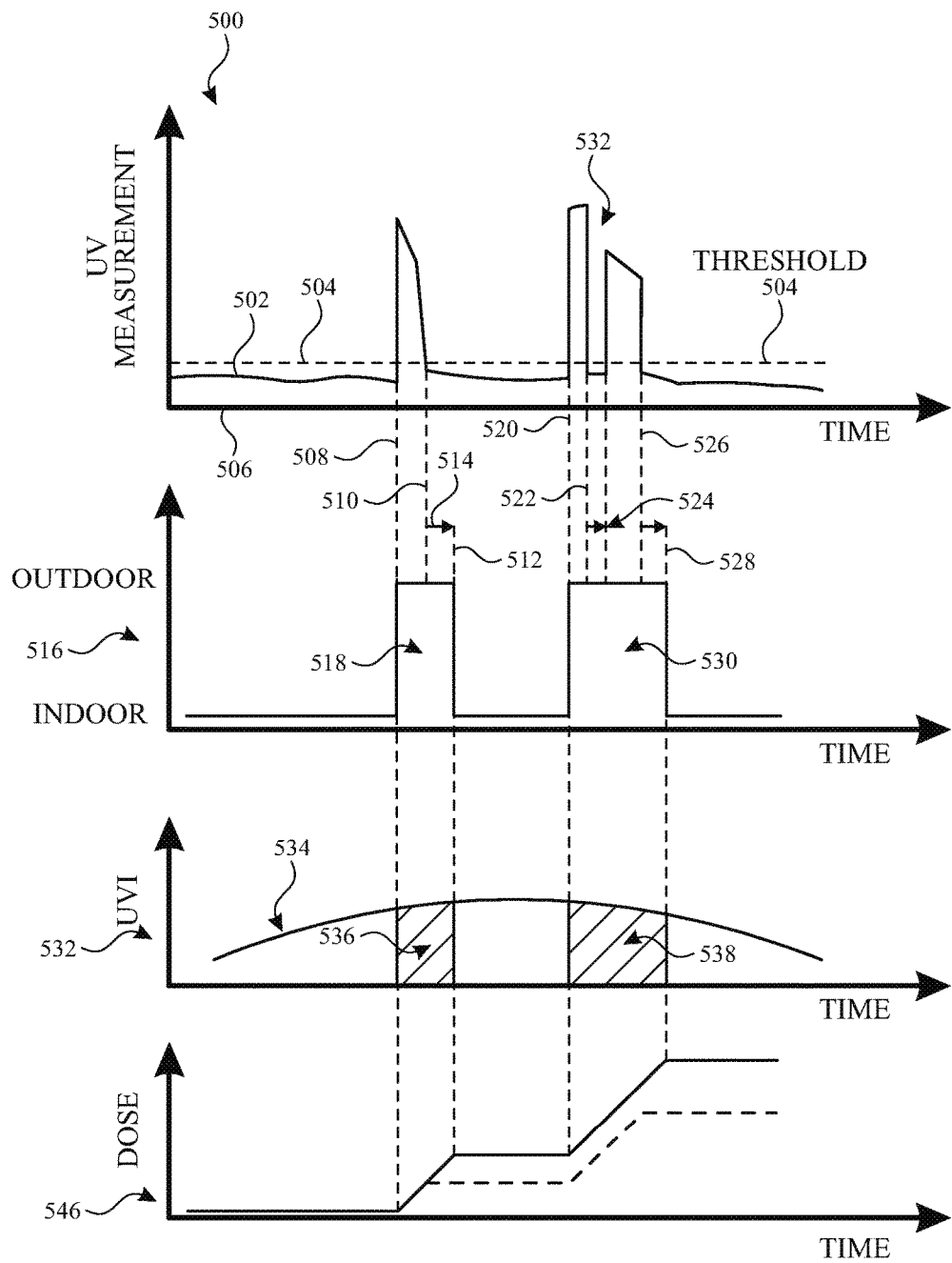
FIGS. 5A-5C illustrate exemplary graphs depicting various measurements of UV exposure based upon UV sensor input according to examples of the disclosure.
Figure 5B:
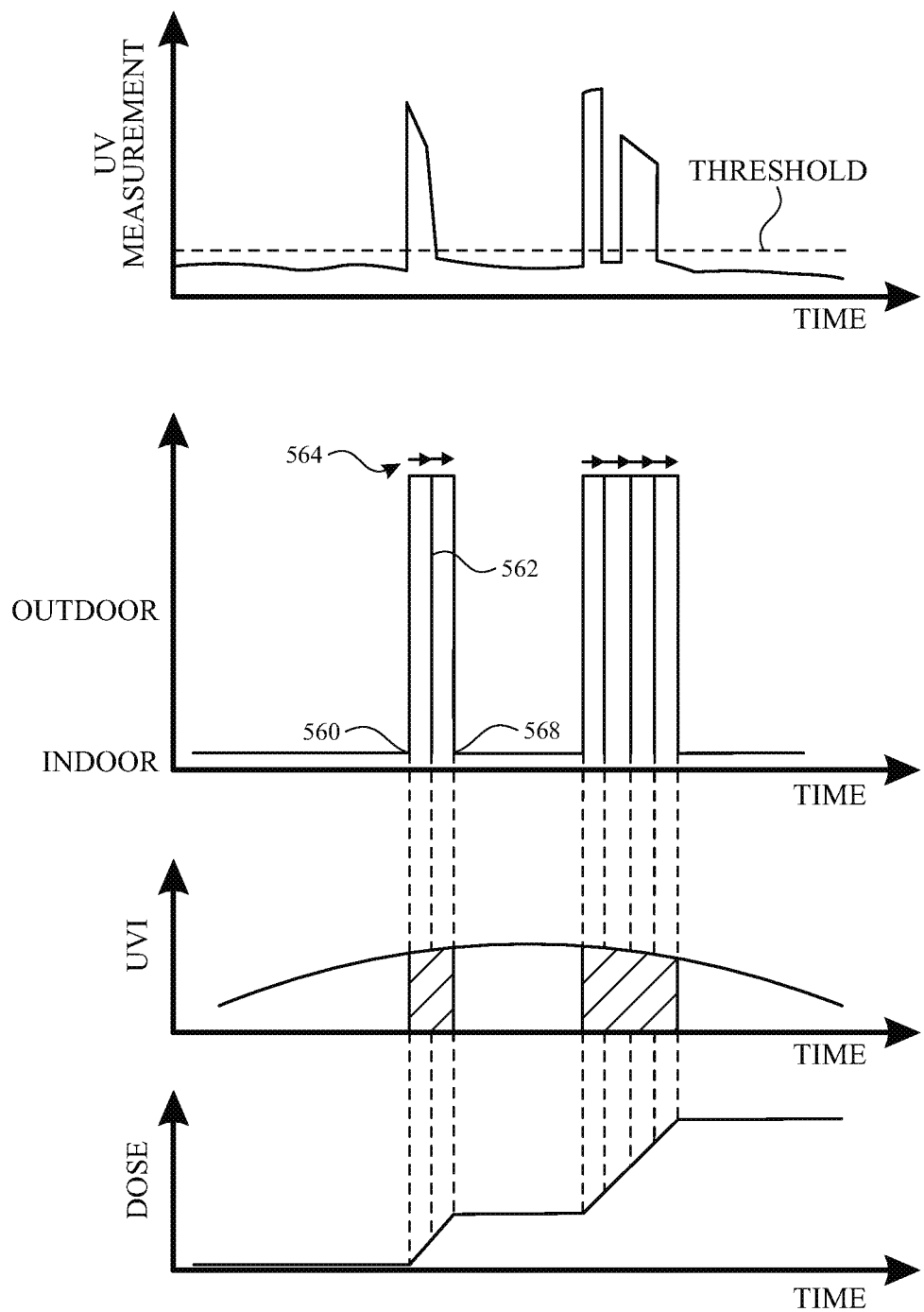
Figure 5C:
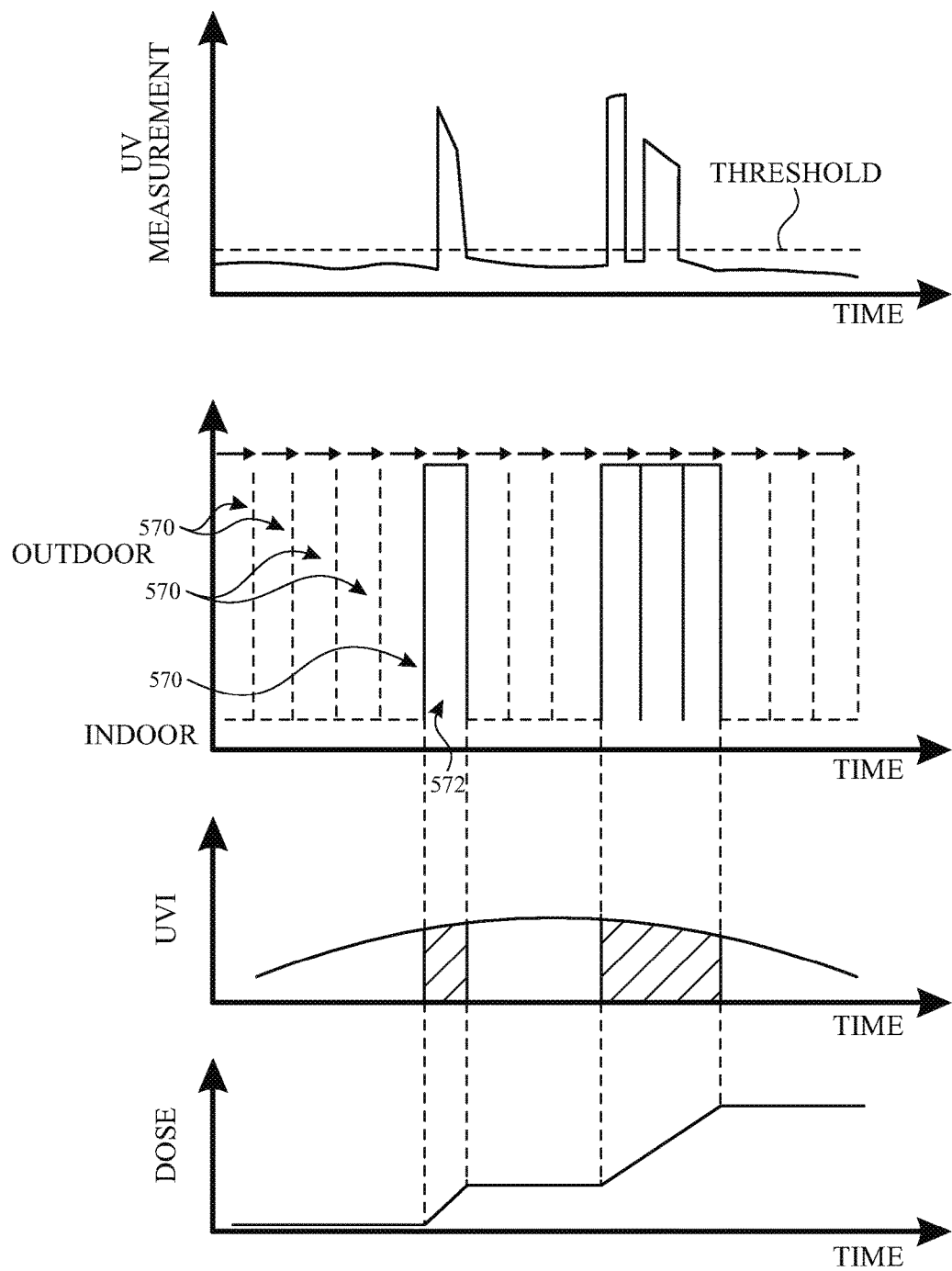

FIGS. 5A-5C illustrate exemplary graphs depicting various measurements of UV exposure based upon UV sensor input according to examples of the disclosure. As illustrated in 5A, the sensor signal from the UV sensor or sensor array may processed in a variety of ways by a controller (e.g., dosimeter controller, wearable and/or mobile device controller, a computing device controller, etc.) to determine a variety outcomes associated with sun exposure and a user's total dosage. In subgraph 500, the sensor signal 502 is received over time by the analyzer module and compared to a threshold value 504. When the sensor signal 502 meets or exceeds the threshold value 504, a start time point 508 is set by the analyzer. The threshold value may be an intensity threshold value, a duration threshold value, or a combination thereof, for example. The intensity threshold value may vary with the particular UV sensor or sensor array used, but may be equivalent to UV Index threshold values of 1, 2, 3, 4, 5, 6, 7, 8, 9, 10 or more, or half increments of UV index values, 0.5, 1.5, 2.5, 3.5, 4.5, 5.5, 6.5, 7.5, 8.5 9.5, or more. For example, the duration threshold value, may be 0.5 seconds, 1 second, 2 seconds, 3 seconds, 4 seconds, 5 seconds, 10 seconds, 15 seconds, 20 seconds, 25 seconds, 30 seconds, 1 minute, 2 minutes, 3 minutes, 4 minutes, 5 minutes or more, for example. When the sensor signal 502 decreases below the threshold value 504, an end time point 510 is identified or set and an incremental or conditional time point 512 is determined. The conditional time point 512 may be calculated based upon the end time point plus a conditional time period 514 or time duration. This conditional time period 514 may be a predetermined or fixed time value. In some variations, the conditional time period 514 may be user-adjustable or may be automatically adjusted or even turned off by the analyzer. For example, if the user is using or wearing the UV dosimeter system in an outdoor situation without any type of clothing that could interfere with the UV sensor, if the analyzer senses a prolonged high sensor signal, the conditional time period 514 may be reduced to zero.

If time 506 progresses and reaches the conditional time point 512 without the sensor signal 502 meeting or exceeding the threshold value 504, the UV exposure is deemed to have ended and an incremental exposure time period may be calculated. As shown in subgraph 516, the incremental exposure period 518 may be calculated or determined based upon the difference between the start time point 508 and the conditional time point 512, but in other variations, the incremental exposure time period may be calculated or determined based upon the start time point 508 and the end time point 510.

Referring back to subgraph 500 of FIG. 5A, if a second start time point 520 is set a second end time point 522 is set or identified and a second conditional time point 524 is determined, but the sensor signal 502 meets or exceeds the threshold value 504 before the second conditional time point 524 is reached, the second end time point 522 and the second conditional time point 524 are canceled, bypassed or otherwise ignored, until the sensor signal 502 again drops below the threshold value 504, at which time the second end time point is re-identified or reset at a new time point 526, and the conditional time point is reset to a new conditional time point 528. When time 506 reaches the new conditional time point 528, another incremental exposure period is calculated or determined.

As depicted in subgraphs 500 and 516, the use of a conditional time period may be used to suppress a transient loss, decrease or drop in the sensor signal. In some circumstances, the transient decreases and drops may represent actual changes from an outdoor to indoor location and back again, while in other circumstances, the transient drops may results from transient partial or complete blockages of the UV sensor while the user remains in an outdoor location. As mentioned previously, this may include blockages from clothing, user body position, or various objects and structures adjacent to the user, including the user him or herself. By the use of the of the conditional time period in the processing and analysis of the exposure time period, a gap 521 resulting from a transient drop may be excluded from the calculation or determination of the exposure time period.

Figure 6A:
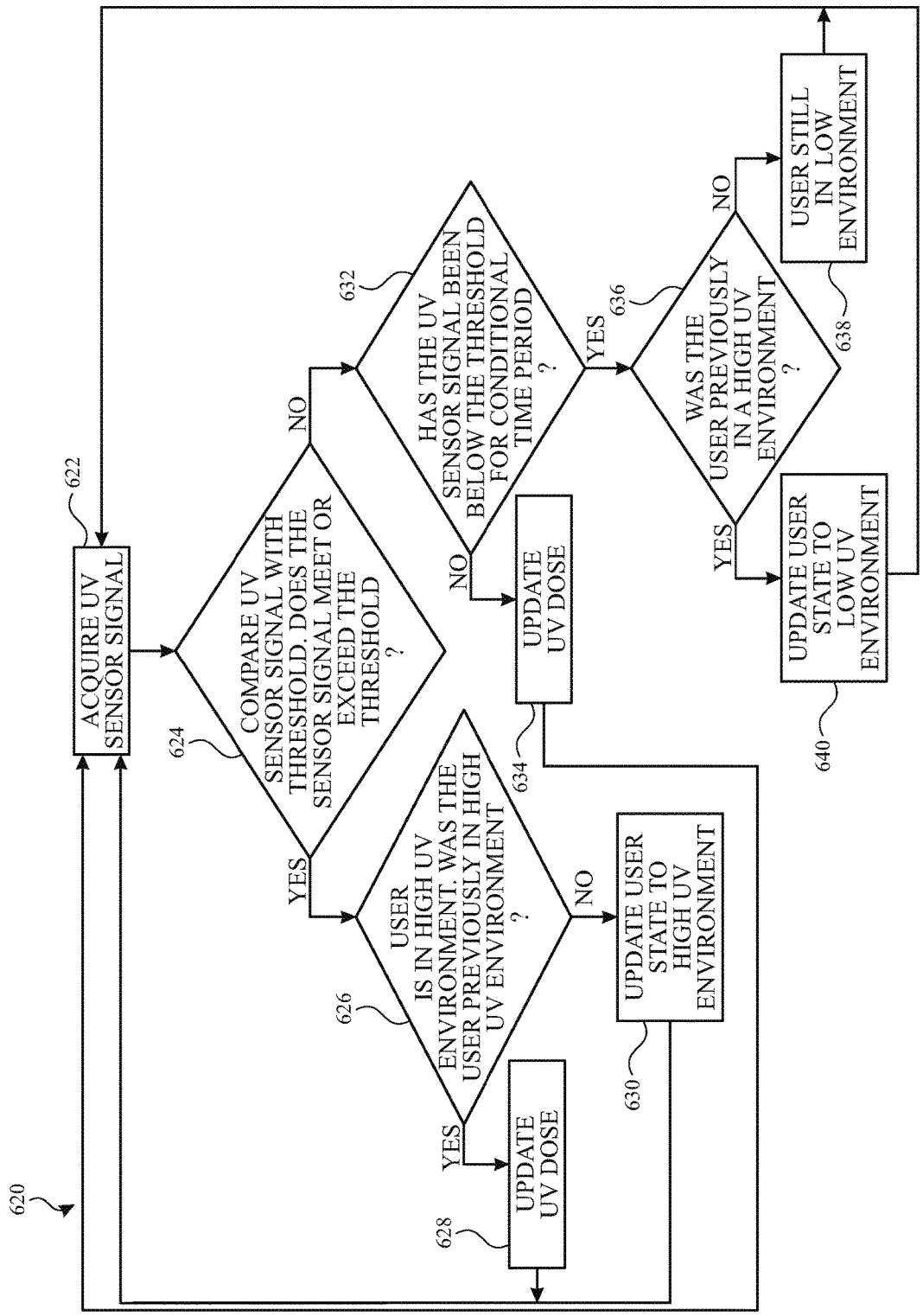
FIG. 6A illustrates a flow diagram of an exemplary method to compute the UV dose based on the UV measurement data and UVI over time, as depicted in the graphs depicted in FIG. 5A, according to examples of the disclosure.

FIG. 6A illustrates a flow diagram of a method that may be carried out by an analyzer module (implemented in, for example, one or more controllers of the UV dosimeter, wearable and/or mobile device, computing device) to compute the UV dose based on the UV measurement data and UVI over time, as depicted in the graphs depicted in FIG. 5A. Changes in UV measurements over time may be used by the analyzer module to determine whether a user is indoors (e.g., a low UV environment) or outdoors (e.g., a high UV environment), and to determine the duration of time spent in each of these environments. Combining this data with geolocation data and the UVI curve over time, the analyzer module may be able to compute the user's cumulative UV dose. The method 620 may comprise acquiring 622 a UV sensor signal, and comparing 624 the sensor signal with a threshold to determine whether the user is in a high UV environment (e.g., outdoors) or in a low UV environment (e.g., indoors). If the sensor signal meets or exceeds the threshold, user is determined to be in a high UV environment. The analyzer may then determine 626 whether the user was previously in a high UV environment, for example, by retrieving previous data or state data in the controller memory. If the user was previously in a high UV environment, then the analyzer module may compute or update 628 values for the cumulative exposure time and the cumulative UV dose (e.g., based on geolocation data and UVI curves, as described elsewhere). The analyzer module may then continue to poll the UV sensor to acquire 622 updated UV sensor signals. If the user was previously not in a high UV environment (that is, was in a low UV environment), then the analyzer module may update the state of the user 630 to indicate that the user is now in a high UV environment. In some variations, the analyzer module may store the time signature data and/or the geolocation of the user, which may represent the time of day and location where the user transitioned from a low UV environment (e.g., indoors, heavily shaded area such as under a tree or tent, etc.) to a high UV environment (e.g., outdoors, covered area with high exposure of UV light such as a greenhouse, skylight, or structure with UV-transmitting windows or glass, tanning bed, etc.). This time signature may also represent the start time point of the UV exposure period. In some variations, the analyzer module may compute or update values for the cumulative exposure time and the cumulative UV dose (e.g., based on geolocation data and UVI curves, as described elsewhere). The analyzer module may then continue to poll the UV sensor to acquire 622 updated UV sensor signals.

However, when comparing 624 the UV sensor signal and determining that the sensor the signal does not meet or exceed the threshold, the analyzer module may then determine 632 whether the sensor signal has been below the threshold for a conditional time period (e.g., the condition time period 514 as described above and depicted in FIG. 5A). If the sensor signal has not been below the threshold for the conditional time period, then the user may be determined to be in a high UV environment, and the analyzer module may compute or update 634 values for the cumulative exposure time and the cumulative UV dose (e.g., based on geolocation data and UVI curves, as described elsewhere). If the sensor signal has been below the threshold for the conditional time period, then the user may be determined to be in a low UV environment. The analyzer may then determine 636 whether the user was previously in a high UV environment, for example, by retrieving previous data or state data in the controller memory. If the user was previously not in a high UV environment (that is, the user was in a low UV environment), then the analyzer module may determine that the user remains in the low UV environment 638. Optionally, in some variations, the analyzer module may store updated geolocation and/or time signature data (e.g., to note the time at which a particular UV sensor signal was acquired and/or processed). Then may the analyzer may proceed to poll the UV sensor to acquire 622 updated UV sensor signals.

If the user was previously in a high UV environment, then the analyzer module may update the state of the user 640 to indicate that the user is now in a low UV environment. In some variations, the analyzer module may store the time signature data and/or the geolocation of the user, which may represent the time of day and location where the user transitioned from a high UV environment (e.g., outdoors, covered area with high exposure of UV light such as a greenhouse, skylight, or structure with UV-transmitting windows or glass, tanning bed, etc.) to a low UV environment (e.g., indoors, heavily shaded area such as under a tree or tent, etc.). This time signature may also represent the end time point of the UV exposure period. The analyzer module may then continue to poll the UV sensor to acquire 622 updated UV sensor signals. The method 620 may be repeated during the operational period of the UV dosimeter.

The detection of the exposure time periods may also be performed in a variety of other ways. In one alternate embodiment, depicted in FIG. 5B, upon setting a start time point 560 as result of a supra-threshold sensor signal, an end time point or exposure period 562 of a predetermined length 564 may be set or determined. If the supra-threshold sensor signal continues beyond the end time point or end of the exposure period, a second start time point and second end time point or predetermined exposure period 568 is set, and so on. Thus, each exposure period has the same duration, but different start time points, which may be serially contiguous for prolonged outdoor exposures. Conditional time periods are not required, although in some variations, a sensor signal duration threshold may be used, e.g., a conditional time period, to set the time signature of that supra-threshold signal as the start time point of an exposure time period. The predetermined length may be anywhere in the range of about 1 second to about 30 minutes or more, about 5 seconds to about 20 minutes, about 30 seconds to about 10 minutes, about 1 minute to about 5 minutes, about 2 minutes to about 5 minutes, about 3 minutes to about 10 minutes, for example.

Figure 6B:
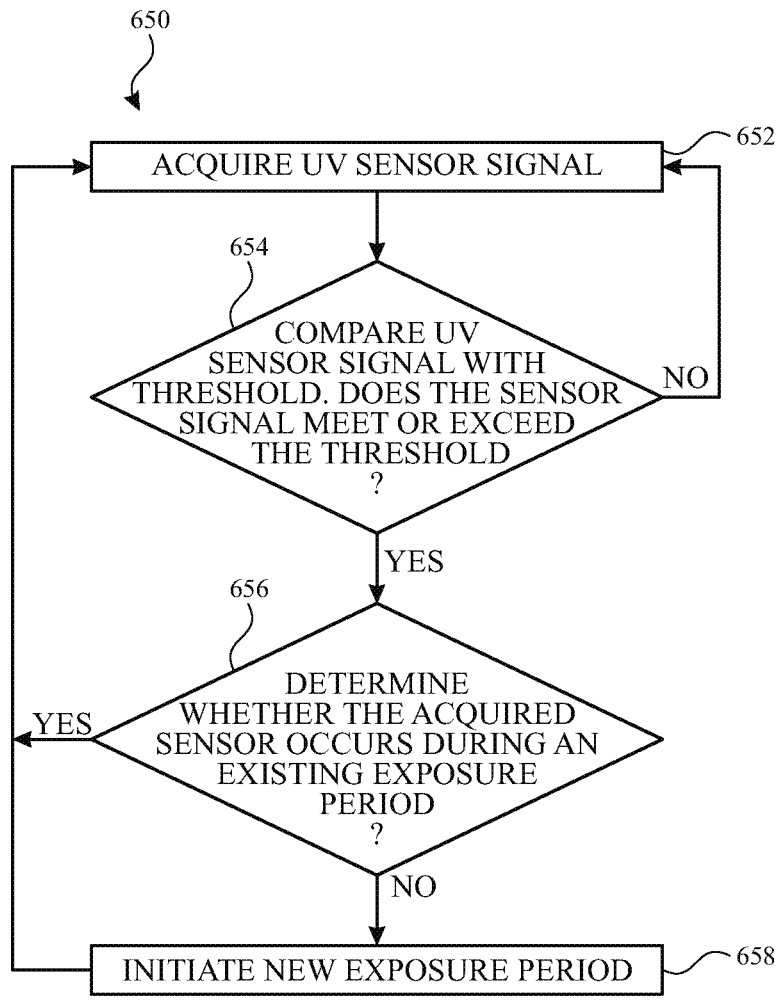
FIG. 6B illustrates a flow diagram of an exemplary method to compute the UV dose based on the UV measurement data and UVI over time, as depicted in the graphs depicted in FIG. 5B.

FIG. 6B illustrates a flow diagram of an exemplary method that may be carried out by an analyzer module (implemented in, for example, one or more controllers of the UV dosimeter, wearable and/or mobile device, computing device) to compute the UV dose based on the UV measurement data and UVI over time, as depicted in the graphs depicted in FIG. 5B. The method 650 may be used to count the number of exposure periods of predetermined length (and optionally including their time signature data, such start time point and end time point) over the course of a day, for example. The method 650 may comprise acquiring 652 a UV sensor signal, and comparing 654 the sensor signal with a threshold to determine whether the user is in a high UV environment (e.g., outdoors) or in a low UV environment (e.g., indoors). If the sensor signal does not meet or exceed the threshold, the analyzer module may continue to poll the UV sensor to acquire 652 updated UV sensor signals. The cumulative UV exposure time and/or the number of UV exposure periods and/or UV cumulative dose may remain unchanged. In some variations, the analyzer module may store the time signature of the acquired UV sensor signal and geolocation data of the user, regardless of whether it exceeds the threshold. If the analyzer module compares 654 the UV sensor signal and determines that it meets or exceeds the threshold, the analyzer module may determine 656 whether the time at which the sensor signal was acquired is within an existing exposure period. For example, the analyzer module may determine whether the time signature of the acquired signal is between an existing start time point and end time point of a exposure time period (e.g., such as exposure period 562 of FIG. 5B). If the time signature of the acquire UV sensor signal is within an existing exposure period, then this particular instance of UV sensor data has already been accounted for in an existing exposure time period and the number of exposure periods may not be incremented. The analyzer module may optionally store the geolocation of the user and the time signature and then may continue to poll the UV sensor to acquire 652 updated UV data. However, if the time signature does not occur within an existing exposure period, the analyzer module may initiate 658 a new exposure period, assign the exposure period start time point to the time signature of the UV sensor signal, and compute the end time point of the exposure period based on the pre-determined length of the exposure period, as described above. The calculated end time point may be used to determine whether later-acquired UV sensor signals occur during the newly initiated exposure period. The analyzer module may also update the cumulative exposure period count (e.g., increment it by one). Optionally, the analyzer module may update the cumulative UV exposure time and dose, and may also store the exposure period start time and end time. The analyzer module may then poll the UV sensor to acquire 652 updated UV sensor data. The method 650 may be repeated during the operational period of the UV dosimeter. Optionally, the method 650 may require the sensor signal to meet or exceed the threshold for a minimum amount of time (e.g., conditional time period) before the sensor signal and/or its timestamp data is further analyzed.

In another embodiment, depicted in FIG. 5C, each day may be predefined into a plurality of contiguous time periods 570 from dawn to dusk. If any supra-threshold sensor signal is sensed during a time period, that time period is classified as an exposure time period 572, regardless of whether the sensor signal decreases or continues to be supra-threshold during that time period. At the end of each time period, the dosage total is calculated or determined based upon the accumulated or aggregated exposure time periods up to that time point. This also does not require any conditional time periods, although in some variations, a sensor signal may be required to exceed the threshold for a minimum amount of time (e.g., a conditional time period) before that time period may be classified as an exposure time period. Each of the time periods may have a predetermined length that may be anywhere in the range of about 1 second to about 30 minutes or more, about 5 seconds to about 20 minutes, about 30 seconds to about 10 minutes, about 1 minute to about 5 minutes, about 2 minutes to about 5 minutes, about 3 minutes to about 10 minutes, for example. The lengths of the time period may be uniform or non-uniform in duration. In some examples, the lengths of each time period may be different, and may be defined or specified based upon the UV index, with shorter time periods during peak UV index values, e.g. high solar noon, and longer time periods at dawn and/or dusk.

Figure 6C:
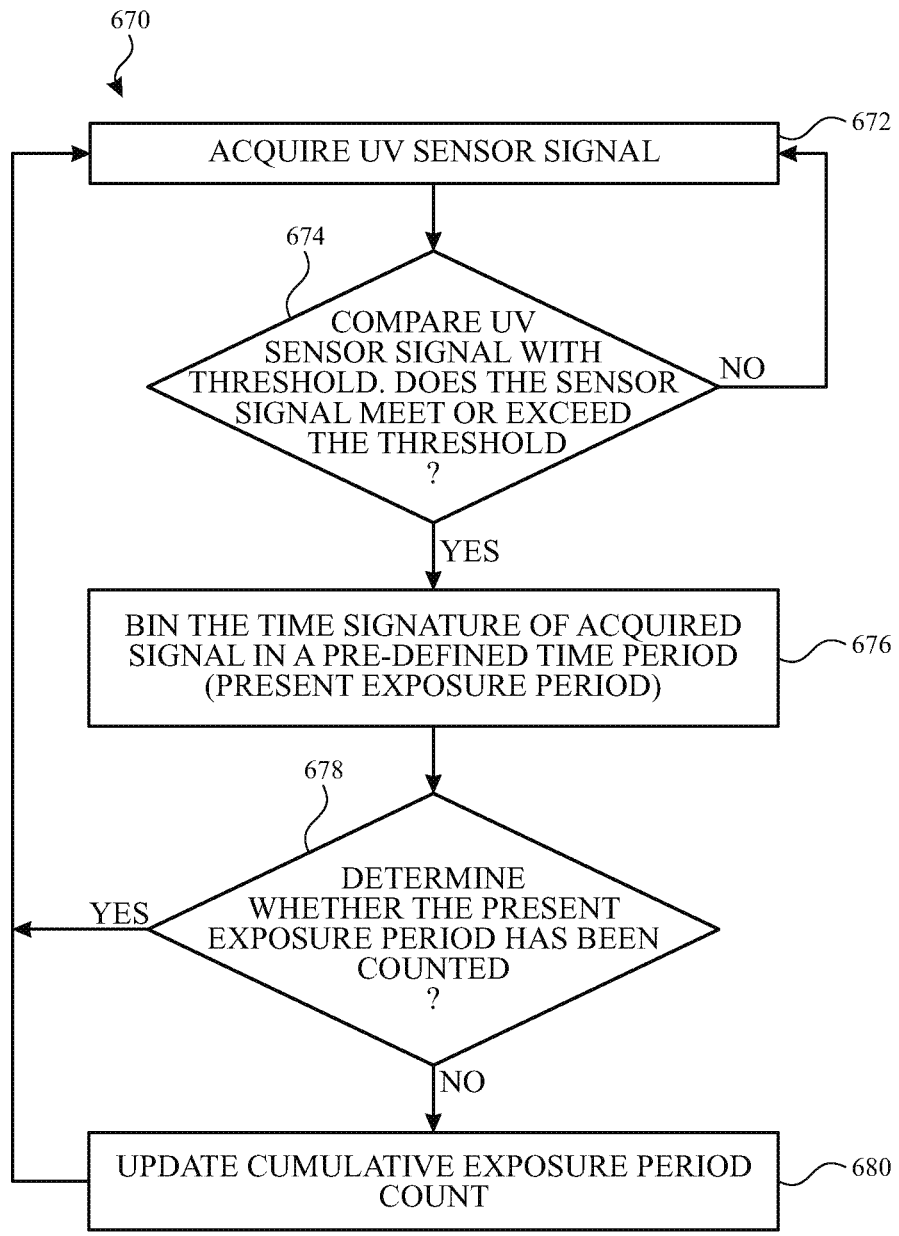
FIG. 6C illustrates a flow diagram of an exemplary method to compute the UV dose based on the UV measurement data and UVI over time, as depicted in the graphs depicted in FIG. 5C.

FIG. 6C illustrates a flow diagram of an exemplary method that may be carried out by an analyzer module (implemented in, for example, one or more controllers of the UV dosimeter, wearable and/or mobile device, computing device) to compute the UV dose based on the UV measurement data and UVI over time, as depicted in the graphs depicted in FIG. 5C. The method 670 may be used to count the number of pre-defined time periods of predetermined length over the course of a day (for example) in which a user is in a high UV environment. The method 670 may comprise acquiring 672 a UV sensor signal, and comparing 674 the sensor signal with a threshold to determine whether the user is in a high UV environment (e.g., outdoors) or in a low UV environment (e.g., indoors). If the sensor signal does not meet or exceed the threshold, the analyzer module may continue to poll the UV sensor to acquire 672 updated UV sensor signals. The cumulative UV exposure time and/or the number of pre-defined time periods during which the user is in a high UV environment (e.g., cumulative exposure period count) and/or UV cumulative dose may remain unchanged. In some variations, the analyzer module may store the time signature of the acquired UV sensor signal and geolocation data of the user. If the analyzer module compares 674 the UV sensor signal and determines that it meets or exceeds the threshold, the analyzer module may bin/sort/identify 676 the pre-defined time period to which the time signature of the acquired UV sensor signal belongs (e.g., the present exposure period). The analyzer module may then determine 678 whether the present exposure period has been included in the cumulative exposure period count. If the present exposure period has been tagged as counted, then the cumulative exposure period count may remain unchanged. The analyzer module may optionally store the time signature of the acquired UV sensor signal and geolocation data of the user and then poll the UV sensor signal to acquire 672 updated sensor signals. If the analyzer module determines 678 that the present expose period has not yet been counted, it will update 680 the cumulative exposure period count (e.g., increment the count by one) and tag or flag the period as counted. The analyzer module may optionally store the geolocation of the user and the time signature and/or may update the cumulative UV exposure time and dose. The analyzer module may then poll the UV sensor to acquire 672 updated UV sensor data. The method 670 may be repeated during the operational period of the UV dosimeter. Optionally, the method 670 may require the sensor signal to meet or exceed the threshold for a minimum amount of time (e.g., conditional time period) before the sensor signal and/or its timestamp data is further analyzed.

Referring to back to FIG. 5A and subgraph 532, to determine the current cumulative dosage total, or at any point during the day, the incremental exposure periods 518 and 530 up to the time point of interest may be aggregated and integrated with or otherwise used with the UVI index 534 to generate an dosage total. In this particular example, the UV Index is represented by a continuous plot of the UV index value 536 over time 538, from dawn to dusk. Each incremental time period 518 and 530 corresponds to an incremental dose value 536 and 538, respectively, which is the area under the curve of the UV index 534.

Figure 1B:
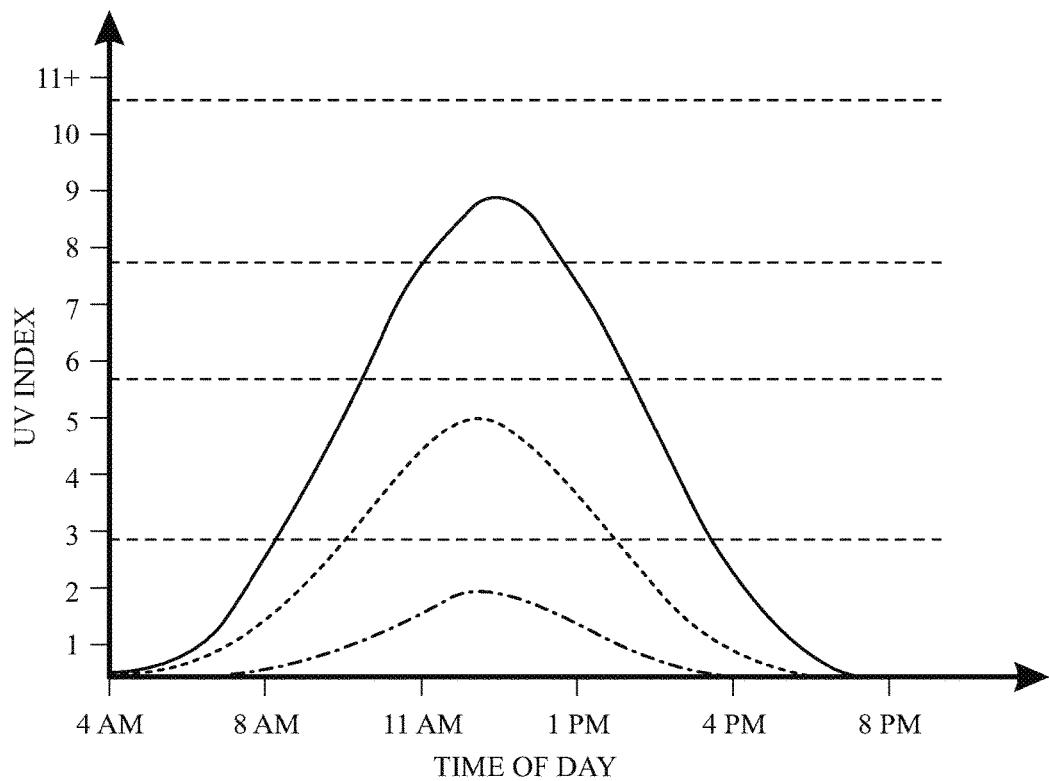
Figure 2:
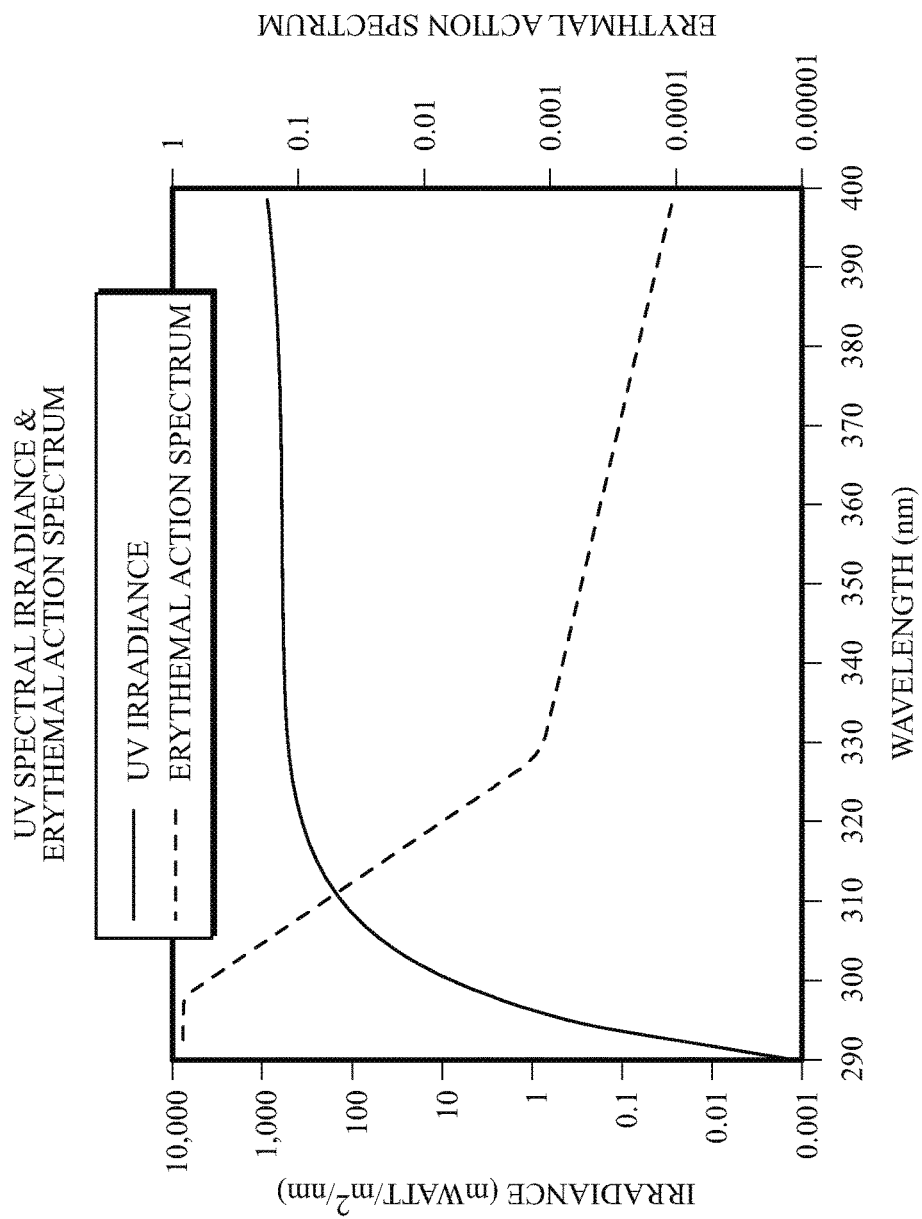
FIG. 2 illustrates an exemplary UV index represented by the McKinlay-Diffey Erythemal Action Spectrum.

As noted above, in other variations, the UV index may be provided as a set of discrete values over the period of time, as shown in FIG. 1B. the discrete values may represent hourly changes to the UV index value, or any other incremental time period, e.g. 1 minute, 2 minutes, 3 minutes, 5 minutes, 10 minutes, 15 minutes, 30 minutes, etc. To determine the incremental dosage corresponding to each incremental time period, the portion of each incremental time period associated with a discrete UV index value may be multiplied or otherwise calculated using the associated discrete UV index value to obtain the incremental dosage. For incremental time periods that span two or more discrete values, the incremental time periods may be subdivided into multiple incremental time periods for calculation of the incremental dosage.

In still other variations, where only a peak UV index value for a day is provided, such as in FIG. 1A, the UV index over time may be derived or estimated using the peak UV index and normalizing either a template UV index relative curve or template set of discrete relative values, for example, to the peak UV index value. The peak UV index value may be remotely retrieved or entered manually by the user. In still other variations, the user may take an actual UV measurement, whether a peak UV index value or non-peak UV index value, and utilize that measured value to normalize the template curves or set values, for example. In still other variations, for example where remote access is not available to retrieve any UV index information, the analyzer may have historical UV index information stored, based upon latitude and general time of year information, that may be used to determine the incremental or total dosage. FIG. 1C, for example, depicts historical or standardized curves for a particular latitude, with a summer curve 540, a fall/spring curve 542 and a winter curve 544, for example.

Referring back to FIG. 5A and subgraph 532, although the depicted incremental doses 536 and 538 are depicted from a completed day, the same process may be applied retrospectively, or may occur in real-time or pseudo real-time as the UV sensor signal is received. In some variations, pseudo real-time processing may correspond to a delay up to the maximum incremental time period. For example, the determination of the incremental dosage may be delayed during the incremental time period while awaiting its final termination. This may be used, for example, when the incremental time period is based upon the end time point, rather than the conditional time point.

Referring to subgraph 546 of FIG. 5A, as the incremental dosage is determined, whether in real time or not, the current or the end-of-day total dosage 548 may also be determined from the accumulated or aggregated exposure time periods, whether completed or still ongoing, and the accumulated or aggregate dosage 550 over time 506 may also be determined. The total dosage 548 and/or accumulated or aggregate dosage 550 over time may be displayed to the user, along with other summary data of the user's past exposure history. Other summary data may include, for example, the number of sunburn or sunburn-free days over a selected time period, and the number of high exposure days over a selected time period. The user's individual data may be displayed along with aggregated group data, where the group data may comprises UV data from other individuals identified by the user, or from anonymized geographical and/or demographic peer group. The group data may be retrieved remotely, and may be provided from the same or different remote source as the UV index data.

Figure 7:
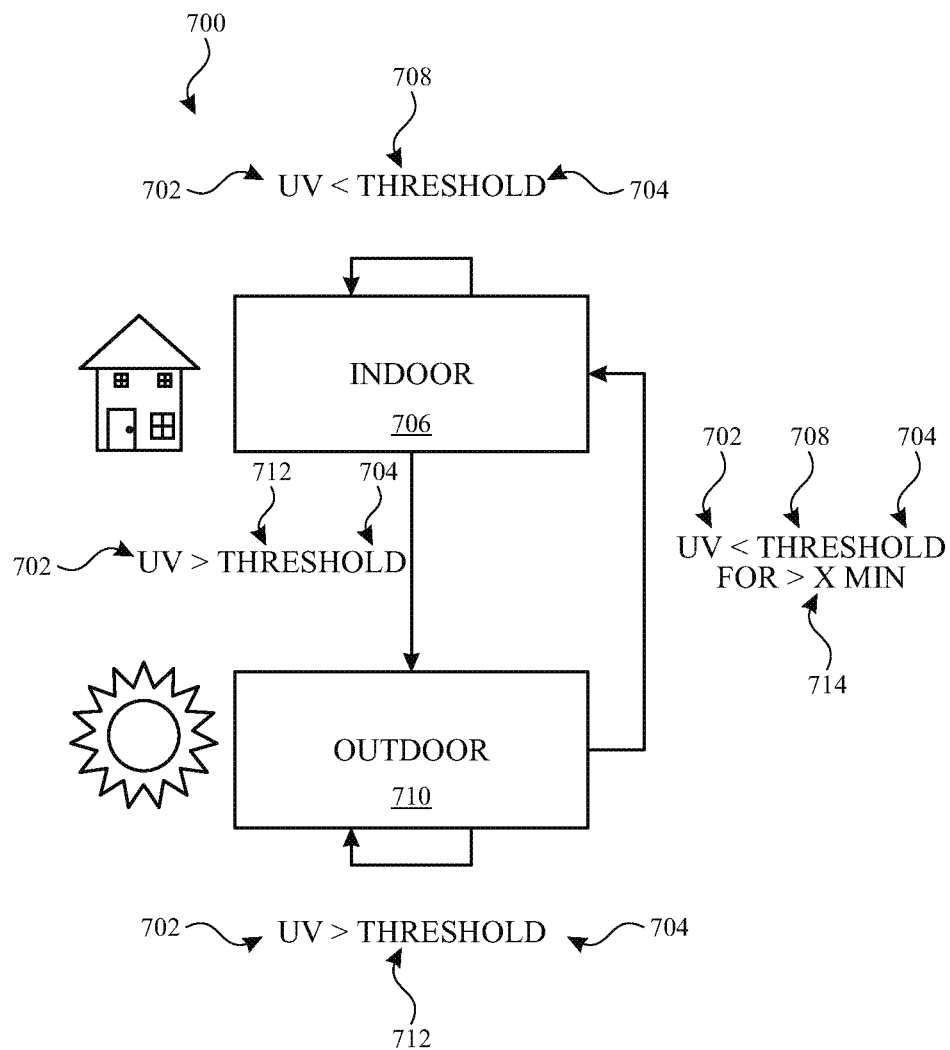
FIG. 7 is a conceptual state diagram of an exemplary method by which the UV dosimeter determines whether a user is indoors or outdoors.

FIG. 7 is a conceptual state diagram of an exemplary method by which the UV dosimeter determines whether a user is indoors or outdoors. Such method may be used in the exemplary process described above and depicted in FIG. 5A and may be implemented in, for example, one or more controllers of the UV dosimeter, wearable and/or mobile device, computing device. Starting, for illustrative purposes, with the UV sensor signal 702 below the UV threshold 704, the current user state may be classified or characterized as an indoor state 706 or subthreshold state. The current user state will remain as an indoor state 706 as long as the UV sensor signal is subthreshold 708, but will change to an outdoor state 710 or supra-threshold state upon the UV sensor signal 702 exceeding the UV threshold 704. The current user state will remain the outdoor state 710 as long as the UV sensor signal is supra-threshold 712. If the UV sensor signal becomes and remain subthreshold for greater than the conditional time period 714, the current user state will change to the indoor state 706, but otherwise remains in the outdoor state 710 for transient subthreshold sensor signals of durations less than the conditional time period 714.

The exemplary process depicted in FIGS. 5A and 7 utilize the same signal threshold for determining whether the signal is subthreshold or supra-threshold. The signal threshold may be selected based upon the particular characteristics of the UV sensor, and may account for sensor sensitivity to UV and/or non-UV light. In other examples, different threshold values may be used based upon the current user state. For example, one threshold value may be used while in the subthreshold state to determine when a change to a supra-threshold state occurs, and a different threshold value may be used while in the supra-threshold state to determine when a change to the subthreshold state occurs. In other variations, different threshold values may be used depending upon the time of day, the time of year, the peak UV index value, the current UV index value based upon the time of day and the continuous or discrete set of UV index values, for example.

While the above methods describe the calculation of the cumulative UV dose as being calculated based on the UVI at a particular location and time, and multiplying that UVI by the exposure duration during that time, other methods of computing the cumulative UV dose may comprise scaling the UVI data based on the local UV measurement.

As shown in FIG. 5, in some examples, other sensor 506 may also be provided to further augment or facilitate the determination of the exposure time periods. For example, an optional visible light or ambient light sensor 544 is provided in conjunction with the UV sensor 542. In other variations, the GPS sensor 532 may serve as another type of sensor, which can provide location information that may be used to retrieve localized UV index information for a particular location and day, and/or use to selected or calculate estimated UV index information based upon historical data or formulas, for example.

Figures 8, 9A:
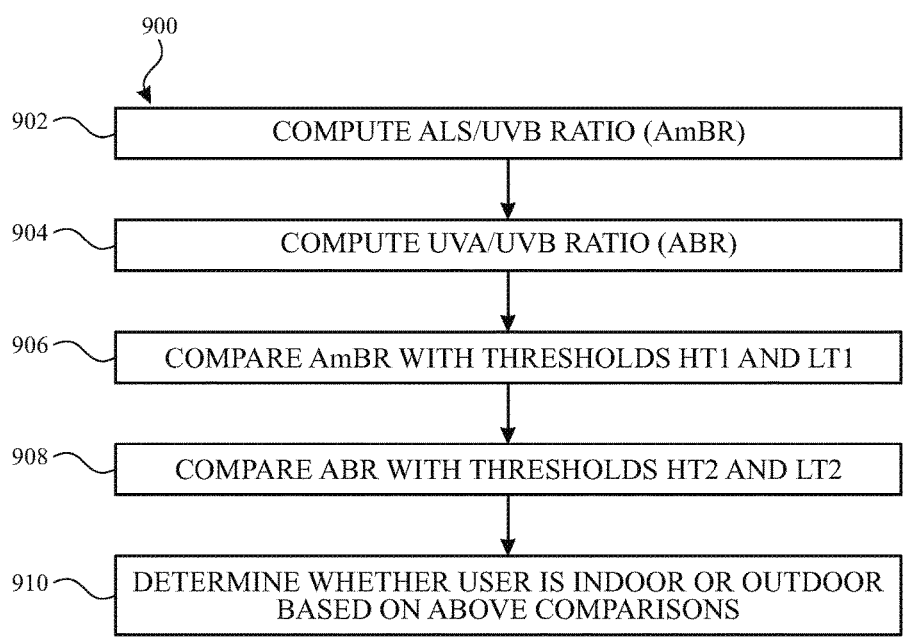
FIG. 8 depicts a table used by the controller to modulate or adjust one or more UV threshold values.
FIG. 9A illustrates a flow diagram of an exemplary method for using UVA and UVA data in conjunction with ALS data to determine whether a user is indoor or outdoor according to examples of the disclosure.

In UV dosimeter systems that comprise a visible light or ambient light sensor, the sensor signal from the ambient light sensor may be used to modulate or adjust one or more UV threshold values and/or conditional time periods, to accommodate for different overall light intensity or light conditions. FIG. 8 depicts a table that may be stored in the memory of the dosimeter controller (and/or wearable or mobile device controller and/or other computing device controller) and used by the controller to modulate or adjust one or more UV threshold values. In some examples, when the ambient light signal is relatively high 802, a higher UV threshold value may be used, and/or the conditional time period may be adjusted downward. When the ambient light signal is relatively low 804, a lower UV threshold may be used, and/or the conditional time period may be adjusted upward. The relationship between the threshold adjustment and the ambient light signal may be linear or non-linear. The adjustment upward and/or downward adjustment may also have a fixed value and subject to an ambient light signal threshold value. In some variations, the UV dosimeter system may comprise one or more default UV threshold values, and the adjustment due to ambient light signal changes may be provided only for a low ambient light state 806 or high ambient light state 808. In other variations, both at least one low ambient light state 802, and at least one high ambient light state 804 may be provided with the default state. In still other variations, the low ambient light state 802 and the high ambient light state 804 may be further conditioned on other sensor signals, such as the UV sensor signal 806. In the exemplary states depicted FIG. 8, the UV dosimeter may have a default state 810, and low and high ambient light conditional states 802, 804 that are conditional upon a UV sensor signal indicative of low UV light conditions. Optionally, as described above, the UV threshold and/or conditional time period may be adjusted based on proximity data, for example, derived from an IR sensor.

The use of the ambient light sensor may permit the detection of UV light even when, for example, the optical path of the UV sensor is blocked by clothing. While many fabrics do attenuate UV radiation by a factor in the range of 2× to 100×, many of such fabrics do not completely block the transmission. For example, white shirts (such as cotton T-shirts or dress shirts) may allow for the transmission of about 25% to about 35% of incident UV light, and blue shirts (such as cotton T-shirts or dress shirts) may allow for the transmission of about 10% to about 20% of incident UV light. Because the sources of UV radiation are generally limited to natural sunlight and tanning light sources, subject to cross-talk from the visible light spectrum, the detection of even a small amount of UV radiation may be indicative of outdoor location. Thus, by utilizing a sufficiently sensitive UV sensor and a lower UV sensor signal threshold, the outdoor location of a user or the device may be accurately detected even when blocked by clothing.

The ambient light sensor may also be used to augment or improve the discriminatory value of the UV sensor signals. For example, the various UV thresholds described herein may correspond to absolute UV sensor signals, or may be normalized to UV sensor signal value over the ambient light sensor signal value, e.g. UV/ALS. Use of these modified or normalized signals may enhance the dynamic range of the UV sensor.

In addition to an ambient light sensor, some examples of UV dosimeters may also comprise one or more UV sensors that are configured to detect and/or distinguish between UVA light and UVB light. Such UV sensor(s) may be able to measure the presence and/or quantity of UVA light separately from the presence and/or quantity of UVB light. In some variations, a single UV sensor is configured to measure UVA and UVB light separately, while in other variations, there may be two separate UV sensors, where the first UV sensor is configured to detect UVA light and the second UV sensor is configured to detect UVB light. When a user is indoors, they may be exposed to high levels of UVA light from artificial light sources. The UVB light exposure indoors may depend on the penetration of outdoor sunlight through a window, and the type of light filtering provided by the window glass. Comparing the relative values of UVA and UVB light, for example, as a ratio UVA/UVB, may further expand the ability of the UV dosimeter to identify whether the user is indoors or outdoors. In a general sense, the ratio UVA/UVB may remain relatively constant regardless of whether the ambient light level is diminished by shade or indirect sunlight, and with artificial light sources (such as when the user is indoors), the ratio may be high due to artificial light emitting larger quantities of UVA light (but little if any UVB light). Sunlight filtered through a glass window may also expose a user to similar light conditions as artificial light. In some cases, the ratio UVA/UVB in combination with the ratio ALS/UVB may help the controller to determine whether the user is indoors but being exposed to sunlight filtered through a window, or outdoors, but is in the shade (e.g., due to cloud cover and/or tree shadows).

One example of how UVA and UVB data may be used in conjunction with ALS data to determine whether a user is indoor or outdoor is represented by the flowchart depicted in FIG. 9A and the tables in FIG. 9B and FIG. 9C. The method 900 may be used by a controller for a UV dosimeter to aggregate ALS, UVA and UVB to identify whether a user is indoors or outdoors. Method 900 may comprise computing 902 the ALS/UVB ratio (AmBR), computing 904 the UVA/UVB ratio (ABR), comparing 906 AmBR with a predetermined high threshold HT1 for AmBR and a predetermined low threshold LT1 for AmBR, comparing 908 ABR with a predetermined high threshold HT2 for ABR and a predetermined low threshold LT2 for ABR, and determining 910, based on the result of the comparisons in steps 906 and 908, whether the user is indoors or outdoors. The high thresholds HT1, HT2 and low thresholds LT1, LT2 may be predetermined based on empirical data and/or mathematical models. The determination step 910 may comprise mapping the results of the comparisons in steps 906 and 908 to a look-up table similar to that depicted in FIG. 9B. In this example, if AmBR is greater than or equal to HT1 (regardless of the value of ABR), or if ABR is greater than or equal to HT2 (regardless of the value of AmBR), the controller may determine that the user is indoors (i.e., not exposed to high levels of UV light). If AmBR is between the high threshold HT1 and the low threshold LT1, and ABR is between the high threshold HT2 and the low threshold LT2, the controller may also determine that the user is indoors. The controller may determine that the user is outdoors (i.e., exposed to high levels of UV light) if AmBR is less than HT1 and ABR is less than LT2, or if ABR is less than HT2 and AmBR is less than LT1. The values of the thresholds HT1, HT2, LT1 and LT2 may vary based on empirical data, calibration data, and/or mathematical modeling of such data. For example, HT1 may be from about 100 to about 1000, or about 200 or about 300, or about 500 or about 700 or about 800, or greater than 100, and LT1 may be from about 5 to about 60, about 5 to about 20, or about 8, or about 10, or about 13, or about 15, or at least about 5 but less than HT1. The thresholds HT2, LT2 for the ABR may be such that HT2 is from about 15 to about 40, or about 20 or about 25, or about 35, or greater than 15, and LT2 may be from about 5 to about 15, or about 5, or about 10, or about 12, or at least about 5 but less than HT2.

FIG. 9C is another example of a table that may be used by the controller to determine whether the user is indoors or outdoors. In this example, the UV dosimeter also comprises an IR proximity sensor that determines whether there is an obstruction over the UV sensor(s) (e.g., clothing sleeve, folded hands, etc.). In situations where the UV sensor(s) may be obstructed, the dosimeter may alert the user of this condition and advise the user to reposition their clothing or body posture to remove the obstruction to the UV sensor(s). If it is determined that the data from the UV sensor(s) is collected during a time period where the UV sensor(s) may be obstructed, the controller may simply rely on the UVB reading to determine whether the user is indoors or outdoors, and not rely on either the AmBR or ABR. The threshold values in the table of FIG. 9C may be similar to the threshold values HT1, HT2, LT1, LT2 described above.

As noted previously, the UV dosimeter controller (and/or a wearable and/or mobile device controller, a computing device controller) may generate one or more alerts to the user relating to UV exposure, UV exposure risk, and/or protective measures that may be recommended. In some variations, an alert may be based upon the UV index information, which may be retrieved or updated from a remote source, so as to provide an alert that is tailored to the specific UV index information for a particular location and date. In other variations, as the cumulative dosage total is computed or updated, the resulting values may be compared to one or more dosage thresholds or criteria. If the criteria are met, an alert or message may be provided by the UV dosimeter. This message may be provided on to the portable electronic device or portable multifunction device, which may be the same or different device in which the UV dosimeter is incorporated.

Some examples of user messages include:
The peak UV index value or the daily UV index, e.g. as shown in FIGS. 1A and 1B, respectively, optionally with corresponding recommended protective measures as recited in FIG. 3.
When the current total dosage exceeds a threshold value, e.g. equivalent to 25 Mw/m$^2$, or multiples thereof, and optionally with corresponding recommended protective measures as recited in FIG. 3.
When the current total dosage exceeds a threshold value prior to a time point, which may be based upon the time of day corresponding to a UV index value in the moderate, high, very high or extreme values, for example.
When the current total dosage exceeds a threshold value corresponding to a prior total dosage in which the user reported one or more adverse skin effects.

In further variations, the alert or message, or the threshold or criteria for providing the alert or message, may be adjusted or changed based upon the skin sensitivity of the user. For example, lowered threshold or criteria for providing alerts may be used for patients with increased skin sensitivity. The skin sensitivity may be based upon a customized scale or a standardized scale, such as the Fitzpatrick scale. The Fitzpatrick scale classifies a person's skin type from a very fair (skin type 1) to very dark (skin type 6), which may be based upon a scored skin type quiz that ranges from 0 to 40 points. The quiz questions include genetic factors, prior reactions to sun exposures, tanning habits, for example. In some variations, the UV dosimeter may be configured so that the user may directly enter his or her skin type or to retrieve such information from an electronic healthcare record source, and/or the UV dosimeter may utilize the display and input modalities of the device to present one or more questions and obtain responses in order to generate a skin sensitivity factor. The skin sensitivity factor may be used to categorically shift and/or numerically adjust one or more alerts conditioned upon the total dosage, the UV index or index value, for example. For instance, alerts which default to a high, very high, or extreme UV index value may get shifted to a lower category, e.g. moderate, high or very high UV index value, for example, or a threshold value based upon a certain mW/m$^2$ value may be reduced by a factor inversely proportional to the numerical skin type, or mathematical equivalent thereof.

Although the examples herein have been described in relation to certain examples, various additional examples and alterations to the described examples are contemplated within the scope of the invention. Thus, no part of the foregoing description should be interpreted to limit the scope of the invention as set forth in the following claims. For all of the examples described above, the steps of the methods need not be performed sequentially. The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

An electronic device is disclosed. The electronic device can comprise: a plurality of ultraviolet light sensors, each ultraviolet light sensor configured to measure an exposure of UV radiation and generate a signal indicative of the UV exposure, the plurality of ultraviolet light sensors located at a plurality of locations along the device; and an analyzer configured to: receive signals from the plurality of ultraviolet light sensors, determine a total exposure time using the signals, the determination including: identify a start time point when the signals from the plurality of ultraviolet light sensors meet or exceed a first threshold, and identify an end time point when the signals from the plurality of ultraviolet light sensors drop below a second threshold, determine a time dependent ultraviolet index information, and determine a total dose using the total exposure time and the ultraviolet index information. Additionally or alternatively, in some examples, the device is capable of detecting the exposure of UV radiation at multiple orientations of the device relative to the UV radiation. Additionally or alternatively, in some examples, at least one of the plurality of ultraviolet sensors is located on a strap attached to the electronic device. Additionally or alternatively, in some examples, a transparent window is located between at least one of the plurality of ultraviolet sensors and an outer surface of the device. Additionally or alternatively, in some examples, at least one of the plurality of ultraviolet sensors is disposed or mounted on an outer surface of the device. Additionally or alternatively, in some examples, the electronic device further comprises: a visible light sensor configured to measure an exposure of visible light radiation and generate a second signal indicative of the visible light radiation, wherein the analyzer is further configured to: set the first threshold using the second signal. Additionally or alternatively, in some examples, the analyzer is further configured to: determine whether an exposure corresponds to UV radiation using the signal, and determine an intensity of the UV radiation using the second signal. Additionally or alternatively, in some examples, the electronic device further comprises: an infrared light sensor configured to generate a third signal indicative of IR radiation, wherein the analyzer is further configured to: determine whether an object is located between a source of the UV radiation and the electronic device. Additionally or alternatively, in some examples, at least one of the plurality of ultraviolet light sensors is configured to discern between UVA and UVB light. Additionally or alternatively, in some examples, at least one of the plurality of ultraviolet light sensors is configured to measure UVA light, and another of the plurality of ultraviolet light sensors is configured to measure UVB light. Additionally or alternatively, in some examples, the electronic device further comprises: an ambient light sensor configured to measure an exposure of ambient light radiation and generate a fourth signal indicative of the ambient light radiation, wherein the analyzer is further configured to: set the first threshold using the fourth signal.

A method for measuring UV exposure using an electronic device is disclosed. The method can comprise: detecting an exposure of UV radiation using a plurality of ultraviolet light sensors; generating a plurality of signals indicative of the exposure of UV radiation; determining a total exposure time using the plurality of signals, the determination including: identifying a start time point when the plurality of signals meet or exceed a first threshold, and identifying an end time point when the plurality of signals drop below a second threshold; determining a time dependent ultraviolet index information; and determining a total dose using the total exposure time and the ultraviolet index information. Additionally or alternatively, in some examples, the determining the total exposure time further includes: setting a conditional time point after the end time point, if during a period between the end time point and the conditional time point, the plurality of signals meet or exceed a third threshold, resetting the end time point and the conditional threshold time, and after reaching the conditional time point, calculating an exposure time between the start time point and either the end time point or the conditional time point. Additionally or alternatively, in some examples, the first and third thresholds are different. Additionally or alternatively, in some examples, the first and second thresholds are different. Additionally or alternatively, in some examples, the determining the total exposure time further includes: identifying a conditional time point after the end time point, if the plurality of signals meet or exceed a third threshold during a time before the conditional time point, cancelling the conditional time point, re-identifying the end time point and the conditional time point after the plurality of signals drop below a fourth threshold, and after reaching the conditional time point, calculating an incremental exposure period between the start time point and either the end time point or the conditional time point. Additionally or alternatively, in some examples, the determining the total exposure time further includes: calculating an incremental dosage using the incremental exposure period and ultraviolet index information, and accumulating the incremental dosage for determining the total exposure time. Additionally or alternatively, in some examples, determining the total exposure time further comprises: determining a number of exposure periods of a predetermined length, each exposure period having the plurality of signals meeting or exceeding the first threshold, and determining whether the number of exposure periods exceeds a predetermined number. Additionally or alternatively, in some examples, detecting an exposure of UV radiation includes detecting an exposure of UVA radiation and detecting an exposure of UVB radiation, the method further comprising: detecting an exposure of ambient light radiation using one or more ambient light sensors; generating one or more second signals indicative of the exposure of ambient light radiation; aggregating the plurality of signals and the one or more second signals; and determining whether the device is indoors or outdoors based on the aggregated signals. Additionally or alternatively, in some examples, the method further comprises: detecting an exposure of visible light radiation using a visible light sensor; generating a second signal indicative of the exposure of visible light radiation; and setting the first threshold using the second signal.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

The invention claimed is:

1. An electronic device, comprising:
    a plurality of ultraviolet light sensors, each ultraviolet light sensor configured to measure an exposure of UV radiation and generate a signal indicative of the UV exposure, the plurality of ultraviolet light sensors located at a plurality of locations along the device; and
    an analyzer configured to:
        receive signals from the plurality of ultraviolet light sensors,
        determine a total exposure time using the signals, the determination including:
            identify a start time point when the signals from the plurality of ultraviolet light sensors meet or exceed a first threshold, and
            identify an end time point when the signals from the plurality of ultraviolet light sensors drop below a second threshold,
        determine a time dependent ultraviolet index information, and
        determine a total dose using the total exposure time and the ultraviolet index information.

2. The electronic device of claim 1, wherein the device is capable of detecting the exposure of UV radiation at multiple orientations of the device relative to the UV radiation.

3. The electronic device of claim 1, wherein at least one of the plurality of ultraviolet sensors is located on a strap attached to the electronic device.

4. The electronic device of claim 1, wherein a transparent window is located between at least one of the plurality of ultraviolet sensors and an outer surface of the device.

5. The electronic device of claim 1, wherein at least one of the plurality of ultraviolet sensors is disposed or mounted on an outer surface of the device.

6. The electronic device of claim 1, further comprising:
    a visible light sensor configured to measure an exposure of visible light radiation and generate a second signal indicative of the visible light radiation,
    wherein the analyzer is further configured to:
        set the first threshold using the second signal.

7. The electronic device of claim 6, wherein the analyzer is further configured to:
    determine whether an exposure corresponds to UV radiation using the signal, and
    determine an intensity of the UV radiation using the second signal.

8. The electronic device of claim 1, further comprising:
    an infrared light sensor configured to generate a third signal indicative of IR radiation,
    wherein the analyzer is further configured to: determine whether an object is located between a source of the UV radiation and the electronic device.

9. The electronic device of claim 1, wherein at least one of the plurality of ultraviolet light sensors is configured to discern between UVA and UVB light.

10. The electronic device of claim 1, wherein at least one of the plurality of ultraviolet light sensors is configured to measure UVA light, and
    another of the plurality of ultraviolet light sensors is configured to measure UVB light.

11. The electronic device of claim 1, further comprising:
    an ambient light sensor configured to measure an exposure of ambient light radiation and generate a fourth signal indicative of the ambient light radiation,
    wherein the analyzer is further configured to:
        set the first threshold using the fourth signal.

12. A method for measuring UV exposure using an electronic device, the method comprising:
    detecting an exposure of UV radiation using a plurality of ultraviolet light sensors;
    generating a plurality of signals indicative of the exposure of UV radiation;
    determining a total exposure time using the plurality of signals, the determination including:
        identifying a start time point when the plurality of signals meet or exceed a first threshold, and
        identifying an end time point when the plurality of signals drop below a second threshold;
    determining a time dependent ultraviolet index information; and
    determining a total dose using the total exposure time and the ultraviolet index information.

13. The method of claim 12, wherein the determining the total exposure time further includes:
    setting a conditional time point after the end time point,
    if during a period between the end time point and the conditional time point, the plurality of signals meet or exceed a third threshold, resetting the end time point and the conditional threshold time, and
    after reaching the conditional time point, calculating an exposure time between the start time point and either the end time point or the conditional time point.

14. The method of claim 13, wherein the first and third thresholds are different.

15. The method of claim 12, wherein the first and second thresholds are different.

16. The method of claim 12, wherein the determining the total exposure time further includes:
    identifying a conditional time point after the end time point, if the plurality of signals meet or exceed a third threshold during a time before the conditional time point, cancelling the conditional time point, re-identifying the end time point and the conditional time point after the plurality of signals drop below a fourth threshold, and after reaching the conditional time point, calculating an incremental exposure period between the start time point and either the end time point or the conditional time point.

17. The method of claim 16, wherein the determining the total exposure time further includes:

calculating an incremental dosage using the incremental exposure period and ultraviolet index information, and accumulating the incremental dosage for determining the total exposure time.

18. The method of claim 12, wherein determining the total exposure time further comprises:

determining a number of exposure periods of a predetermined length, each exposure period having the plurality of signals meeting or exceeding the first threshold, and determining whether the number of exposure periods exceeds a predetermined number.

19. The method of claim 12, wherein detecting an exposure of UV radiation includes detecting an exposure of UVA radiation and detecting an exposure of UVB radiation, the method further comprising:

detecting an exposure of ambient light radiation using one or more ambient light sensors;

generating one or more second signals indicative of the exposure of ambient light radiation;

aggregating the plurality of signals and the one or more second signals; and determining whether the device is indoors or outdoors based on the aggregated signals.

20. The method of claim 12, further comprising:

detecting an exposure of visible light radiation using a visible light sensor;

generating a second signal indicative of the exposure of visible light radiation; and setting the first threshold using the second signal.

* * * * *